(12) United States Patent
Zweig et al.

(10) Patent No.: US 11,531,863 B1
(45) Date of Patent: Dec. 20, 2022

(54) SYSTEMS AND METHODS FOR LOCALIZATION AND CLASSIFICATION OF CONTENT IN A DATA SET

(71) Applicant: Meta Platforms Technologies, LLC, Menlo Park, CA (US)

(72) Inventors: Geoffrey Gerson Zweig, Scarsdale, NY (US); Prahal Arora, New York, NY (US); Gourab Kundu, Scarsdale, NY (US); Polina Kuznetsova, New York, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 616 days.

(21) Appl. No.: 16/535,252

(22) Filed: Aug. 8, 2019

(51) Int. Cl.
| | |
|---|---|
| *G06F 17/00* | (2019.01) |
| *G06N 3/04* | (2006.01) |
| *G06K 9/62* | (2022.01) |
| *G06N 3/08* | (2006.01) |
| *G06F 40/30* | (2020.01) |

(52) U.S. Cl.
CPC ........... *G06N 3/0445* (2013.01); *G06F 40/30* (2020.01); *G06K 9/6267* (2013.01); *G06N 3/08* (2013.01)

(58) Field of Classification Search
CPC ...... G06N 3/0445; G06N 3/08; G06K 9/6267; G06F 40/30
See application file for complete search history.

(56) References Cited

U.S. PATENT DOCUMENTS

| | | | |
|---|---|---|---|
| 11,295,501 B1* | 4/2022 | Biswas | G06N 20/00 |
| 2017/0262996 A1* | 9/2017 | Jain | G06K 9/628 |
| 2018/0157743 A1* | 6/2018 | Hori | G06N 3/0445 |
| 2019/0130273 A1* | 5/2019 | Keskar | G06N 3/0454 |
| 2019/0171913 A1* | 6/2019 | Cheng | G06N 20/10 |
| 2019/0370587 A1* | 12/2019 | Burachas | G06N 3/0445 |
| 2020/0193296 A1* | 6/2020 | Dixit | G06N 3/084 |
| 2020/0250528 A1* | 8/2020 | van den Oord | G06N 3/08 |
| 2020/0342316 A1* | 10/2020 | Shazeer | G06N 3/0445 |
| 2020/0356724 A1* | 11/2020 | Li | G06F 40/30 |
| 2021/0117815 A1* | 4/2021 | Creed | G06F 17/16 |
| 2021/0224578 A1* | 7/2021 | Blundell | G06V 10/751 |
| 2022/0114452 A1* | 4/2022 | Gredilla | G06N 3/0454 |
| 2022/0117552 A1* | 4/2022 | Kim | A61B 5/055 |
| 2022/0230276 A1* | 7/2022 | Clark | G06N 3/088 |

FOREIGN PATENT DOCUMENTS

CN 109902583 A * 6/2019

\* cited by examiner

*Primary Examiner* — Laurie A Ries
(74) *Attorney, Agent, or Firm* — Foley & Lardner LLP

(57) ABSTRACT

Disclosed herein includes a system, a method, and a device for localizing and classifying content in a data set. A device can provide a sequence of portions of a data set to a neural network to generate a plurality of activations. Each activation of the plurality of activations can include at least one value from a layer of the neural network. The device can apply an attention vector to each activation of the plurality of activations to generate a sequence of values. A normalization function can be applied to the sequence of values to generate a sequence of attention scores according to the sequence of values. The device can identify or localize one or more portions in the sequence of portions of the data based in part on the sequence of attention scores.

20 Claims, 10 Drawing Sheets

SYSTEMS AND METHODS FOR LOCALIZATION AND CLASSIFICATION OF CONTENT IN A DATA SET

FIELD OF DISCLOSURE

The present disclosure is generally related to handling of data of a neural network, including but not limited to systems and methods for localizing and classifying content in a data set.

BACKGROUND

Artificial intelligence (AI) processing can use different forms of activation functions. The activation functions can generate output(s) of one or more nodes in a neural network given a set of inputs. The activation functions can output either positive or negative values based on the set of inputs. The activation functions can activate one or more neurons in the neural network with positive values and one or more neurons in the neural network with negative values.

SUMMARY

Devices, systems and methods for localization and classification of content in a data set are provided herein. A device can localize and classify a sequence of portions of a data set to identify or flag specific content within the portions, for example, to identify portions for removal from the data set, to highlight the portions, or otherwise modify the data set based in part on the content within the portions of the data set. For example, the amount of time and/or effort for review or examination of a data set (e.g., video file, text file, audio file, image file) can be reduced based in part on classifications generated for the different portions of the data set to indicate specific portions that should be reviewed, and/or to indicate specific portions that do not need to be reviewed, that can be ignored or can be removed.

In some embodiments, a device can include at least one neural network, and can be configured to localize and classify content or portions of a data set. The at least one neural network can include a recurrent neural network (RNN) and a feedforward neural network (NN), for example. The device can provide the portions of the data set to the RNN to localize or identify key features, important features or other forms of noteworthy characteristic of the content within the respective portions of the data set. In some embodiments, a learned attention vector can be applied to a last layer of the RNN, for example, at each time/sequence step of the data set, to produce a sequence of values (or activations). A probability determination can be performed on each of the values to determine or generate a probability distribution, or an attention score for each portion of the plurality of portions of the data set. In some embodiments, the device can apply the attention scores (as weights) to each activation of the last layer of the RNN to generate weighted vectors or values (e.g., weighted RNN activations) for each portion of the plurality of portions of the data set. The weighted vectors or values can be summed or combined and provided to the feedforward NN to determine a classification for the plurality of portions of the data set. The device or a user of the device can use the classification(s) to reduce a review time of the original data set by flagging specific portions that should be reviewed and/or flagging specific portions that do not need to be reviewed or can be removed. In some embodiments, the device or a user of the device can use the classification(s) to edit, modify, sanitize, obfuscate or remove portions of the original data to generate a modified data set having portions with specific or desired content.

In at least one aspect, a method is provided. The method can include providing, by a device having one or more processors, a sequence of portions of a data set to a neural network to generate a plurality of activations. Each activation of the plurality of activations can include at least one value from a layer of the neural network. The method can include applying, by the device, an attention vector to each activation of the plurality of activations to generate a sequence of values. The method can include generating, by the device using a normalization function, a sequence of attention scores according to the sequence of values. The method can include identifying, by the device, a first portion in the sequence of portions of the data set corresponding to a first attention score of the sequence of attention scores.

In some embodiments, the method can include applying, by the device, the plurality of activations to the sequence of attention scores to generate a weighted vector (e.g., weighted RNN activations) for each of the portions of the data set. In some embodiments, a respective activation for one of the portions of the data set can be applied to a respective attention score for the one of the portions of the data set. The method can include combining, by the device, the weighted vectors (e.g., weighted RNN activations) for the portions of the data set, into a combined score. The method can include providing, by the device, the combined score as input to a feedforward neural network to determine a first classification for the data set, from a plurality of classifications. The method can include identifying, by the device, at least one portion in the sequence of portions of the data set, according to the first classification. The method can include removing or modifying, by the device, the identified at least one portion in the data set.

In some embodiments, the method can include comparing, by the device, the attention scores to a threshold, and identifying, according to the comparing, at least one portion in the sequence of portions of the data set. In some embodiments, the data set can include at least one of text data, image data, video data or audio data. In some embodiments, the data set can includes a sequence of portions of text data and a sequence of portions of image data. Each of the portions of text data can include a respective sequence value, and each of the portions of image data having a corresponding sequence value. The method can include providing, by the device to the neural network, a first portion in the sequence of portions of image data, and a first portion in the sequence of portions of text data having a sequence value corresponding to that of the first portion in the sequence of portions of image data, to generate a first activation of the plurality of activations.

In some embodiments, the neural network can include a bi-directional recurrent neural network, and the activations can include values from a last hidden layer of the bi-directional recurrent neural network. The method can include generating, by the device, the attention vector from a training set of data having at least one of: one or more known classifications, or one or more text data embeddings.

In at least one aspect, a device is provided. The device can include one or more processors. The one or more processors can be configured to provide a sequence of portions of a data set to a neural network to generate a plurality of activations. Each activation of the plurality of activations can include at least one value from a layer of the neural network. The one or more processors can be configured to apply an attention vector to each activation of the plurality of activations to generate a sequence of values. The one or more processors can be configured to generate, using a normalization function, a sequence of attention scores according to the sequence of values. The one or more processors can be configured to identify a first portion in the sequence of portions of the data set corresponding to a first attention score of the sequence of attention scores.

In some embodiments, the one or more processors can be configured to apply the plurality of activations to the sequence of attention scores to generate a weighted vectors for each of the portions of the data set. The one or more processors can be configured to combine the weighted vectors for the portions of the data set, into a combined score. The one or more processors can be configured to provide the combined score as input to a feedforward neural network to determine a first classification for the data set, from a plurality of classifications. The one or more processors can be configured to identify at least one portion in the sequence of portions of the data set, according to the first classification. The one or more processors can be configured to remove or modify the identified at least one portion in the data set. The one or more processors can be configured to compare the attention scores to a threshold and identify, according to the comparing, at least one portion in the sequence of portions of the data set.

In at least one aspect, a non-transitory computer readable medium storing instructions in provided. The instructions when executed by one or more processors can cause the one or more processors to provide a sequence of portions of a data set to a neural network to generate a plurality of activations. Each activation of the plurality of activations can include at least one value from a layer of the neural network. The instructions when executed by one or more processors can cause the one or more processors to apply an attention vector to each activation of the plurality of activations to generate a sequence of values. The instructions when executed by one or more processors can cause the one or more processors to generate, using a normalization function, a sequence of attention scores according to the sequence of values. The instructions when executed by one or more processors can cause the one or more processors to identify a first portion in the sequence of portions of the data set corresponding to a first attention score of the sequence of attention scores. In some embodiments, the instructions when executed by one or more processors can cause the one or more processors to apply the plurality of activations to the sequence of attention scores to generate a weighted vector (e.g., weighted RNN activation) for each of the portions of the data set.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes an environment, system, configuration and/or other aspects useful for practicing or implementing an embodiment of the present systems, methods and devices; and Section B describes embodiments of devices, systems and methods for localization and classification of content in a data set.

A. Environment for Artificial Intelligence Related Processing

Figure 1A:
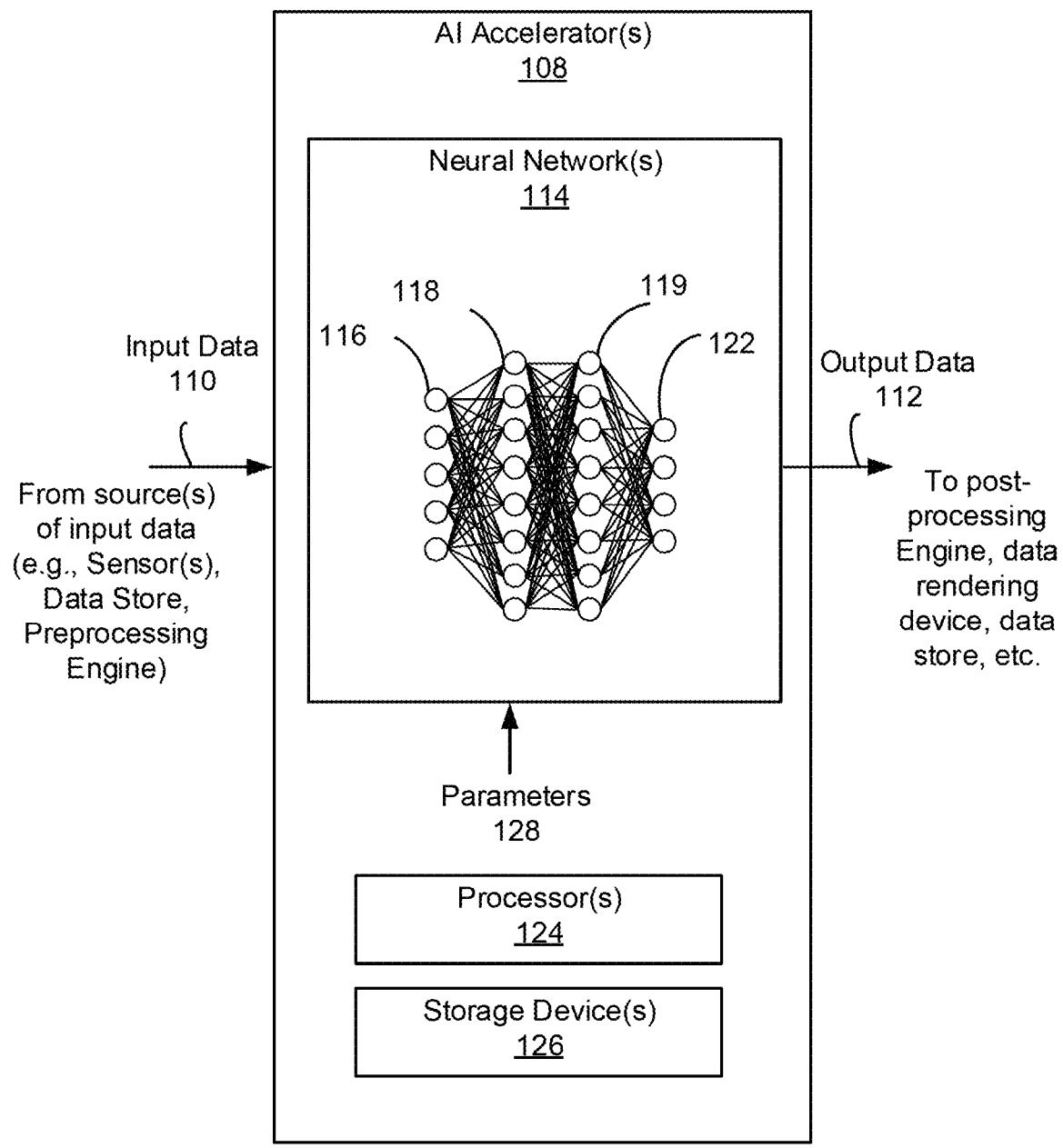
FIG. 1A is a block diagram of an embodiment of a system for performing artificial intelligence (AI) related processing, according to an example implementation of the present disclosure.

Prior to discussing the specifics of embodiments of systems, devices and/or methods in Section B, it may be helpful to discuss the environments, systems, configurations and/or other aspects useful for practicing or implementing certain embodiments of the systems, devices and/or methods. Referring now to FIG. 1A, an embodiment of a system for performing artificial intelligence (AI) related processing is depicted. In brief overview, the system includes one or more AI accelerators 108 that can perform AI related processing using input data 110. Although referenced as an AI accelerator 108, it is sometimes referred as a neural network accelerator (NNA), neural network chip or hardware, AI processor, AI chip, etc. The AI accelerator(s) 108 can perform AI related processing to output or provide output data 112, according to the input data 110 and/or parameters 128 (e.g., weight and/or bias information). An AI accelerator 108 can include and/or implement one or more neural networks 114 (e.g., artificial neural networks), one or more processor(s) and/or one or more storage devices 12.

Each of the above-mentioned elements or components is implemented in hardware, or a combination of hardware and software. For instance, each of these elements or components can include any application, program, library, script, task, service, process or any type and form of executable instructions executing on hardware such as circuitry that can include digital and/or analog elements (e.g., one or more transistors, logic gates, registers, memory devices, resistive elements, conductive elements, capacitive elements).

The input data 110 can include any type or form of data for configuring, tuning, training and/or activating a neural network 114 of the AI accelerator(s) 108, and/or for processing by the processor(s) 124. The neural network 114 is sometimes referred to as an artificial neural network (ANN). Configuring, tuning and/or training a neural network can refer to or include a process of machine learning in which training data sets (e.g., as the input data 110) such as historical data are provided to the neural network for processing. Tuning or configuring can refer to or include training or processing of the neural network 114 to allow the neural network to improve accuracy. Tuning or configuring the neural network 114 can include, for example, designing the neural network using architectures for that have proven to be successful for the type of problem or objective desired for the neural network 114. In some cases, the one or more neural networks 114 may initiate at a same or similar baseline model, but during the tuning, training or learning process, the results of the neural networks 114 can be sufficiently different such that each neural network 114 can be tuned to process a specific type of input and generate a specific type of output with a higher level of accuracy and reliability as compared to a different neural network that is either at the baseline model or tuned or trained for a different objective or purpose. Tuning the neural network 114 can include setting different parameters 128 for each neural network 114, fine-tuning the parameters 128 differently for each neural network 114, or assigning different weights (e.g., hyperparameters, or learning rates), tensor flows, etc. Thus, by setting appropriate parameters 128 for the neural network(s) 114 based on a tuning or training process and the objective of the neural network(s) and/or the system, this can improve performance of the overall system.

A neural network 114 of the AI accelerator 108 can include any type of neural network including, for example, a convolution neural network (CNN), deep convolution network, a feed forward neural network (e.g., multilayer perceptron (MLP)), a deep feed forward neural network, a radial basis function neural network, a Kohonen self-organizing neural network, a recurrent neural network, a modular neural network, a long/short term memory neural network, etc. The neural network(s) 114 can be deployed or used to perform data (e.g., image, audio, video) processing, object or feature recognition, recommender functions, data or image classification, data (e.g., image) analysis, etc., such as natural language processing.

As an example, and in one or more embodiments, the neural network 114 can be configured as or include a convolution neural network. The convolution neural network can include one or more convolution cells (or pooling layers) and kernels, that can each serve a different purpose. The convolution neural network can include, incorporate and/or use a convolution kernel (sometimes simply referred as "kernel"). The convolution kernel can process input data, and the pooling layers can simplify the data, using, for example, non-linear functions such as a max, thereby reducing unnecessary features. The neural network 114 including the convolution neural network can facilitate image, audio or any data recognition or other processing. For example, the input data 110 (e.g., from a sensor) can be passed to convolution layers of the convolution neural network that form a funnel, compressing detected features in the input data 110. The first layer of the convolution neural network can detect first characteristics, the second layer can detect second characteristics, and so on.

The convolution neural network can be a type of deep, feed-forward artificial neural network configured to analyze visual imagery, audio information, and/or any other type or form of input data 110. The convolution neural network can include multilayer perceptrons designed to use minimal preprocessing. The convolution neural network can include or be referred to as shift invariant or space invariant artificial neural networks, based on their shared-weights architecture and translation invariance characteristics. Since convolution neural networks can use relatively less pre-processing compared to other data classification/processing algorithms, the convolution neural network can automatically learn the filters that may be hand-engineered for other data classification/processing algorithms, thereby improving the efficiency associated with configuring, establishing or setting up the neural network 114, thereby providing a technical advantage relative to other data classification/processing techniques.

The neural network 114 can include an input layer 116 and an output layer 122, of neurons or nodes. The neural network 114 can also have one or more hidden layers 118, 119 that can include convolution layers, pooling layers, fully connected layers, and/or normalization layers, of neurons or nodes. In a neural network 114, each neuron can receive input from some number of locations in the previous layer. In a fully connected layer, each neuron can receive input from every element of the previous layer.

Each neuron in a neural network 114 can compute an output value by applying some function to the input values coming from the receptive field in the previous layer. The function that is applied to the input values is specified by a vector of weights and a bias (typically real numbers). Learning (e.g., during a training phase) in a neural network 114 can progress by making incremental adjustments to the biases and/or weights. The vector of weights and the bias can be called a filter and can represents some feature of the input (e.g., a particular shape). A distinguishing feature of convolutional neural networks is that many neurons can share the same filter. This reduces memory footprint because a single bias and a single vector of weights can be used across all receptive fields sharing that filter, rather than each receptive field having its own bias and vector of weights.

For example, in a convolution layer, the system can apply a convolution operation to the input layer 116, passing the result to the next layer. The convolution emulates the response of an individual neuron to input stimuli. Each convolutional neuron can process data only for its receptive field. Using the convolution operation can reduce the number of neurons used in the neural network 114 as compared to a fully connected feedforward neural network. Thus, the convolution operation can reduces the number of free parameters, allowing the network to be deeper with fewer parameters. For example, regardless of an input data (e.g., image data) size, tiling regions of size 5×5, each with the same shared weights, may use only 25 learnable parameters. In this way, the first neural network 114 with a convolution neural network can resolve the vanishing or exploding gradients problem in training traditional multi-layer neural networks with many layers by using backpropagation.

The neural network 114 (e.g., configured with a convolution neural network) can include one or more pooling layers. The one or more pooling layers can include local pooling layers or global pooling layers. The pooling layers can combine the outputs of neuron clusters at one layer into a single neuron in the next layer. For example, max pooling can use the maximum value from each of a cluster of neurons at the prior layer. Another example is average pooling, which can use the average value from each of a cluster of neurons at the prior layer.

The neural network 114 (e.g., configured with a convolution neural network) can include fully connected layers. Fully connected layers can connect every neuron in one layer to every neuron in another layer. The neural network 114 can be configured with shared weights in convolutional layers, which can refer to the same filter being used for each receptive field in the layer, thereby reducing a memory footprint and improving performance of the first neural network 114.

The hidden layers 118, 119 can include filters that are tuned or configured to detect information based on the input data (e.g., sensor data, from a virtual reality system for instance). As the system steps through each layer in the neural network 114 (e.g., convolution neural network), the system can translate the input from a first layer and output the transformed input to a second layer, and so on. The neural network 114 can include one or more hidden layers 118, 119 based on the type of object or information being detected, processed and/or computed, and the type of input data 110.

In some embodiments, the convolutional layer is the core building block of a neural network 114 (e.g., configured as a CNN). The layer's parameters 128 can include a set of learnable filters (or kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the neural network 114 can learn filters that activate when it detects some specific type of feature at some spatial position in the input. Stacking the activation maps for all filters along the depth dimension forms the full output volume of the convolution layer. Every entry in the output volume can thus also be interpreted as an output of a neuron that looks at a small region in the input and shares parameters with neurons in the same activation map. In a convolutional layer, neurons can receive input from a restricted subarea of the previous layer. Typically the subarea is of a square shape (e.g., size 5 by 5). The input area of a neuron is called its receptive field. So, in a fully connected layer, the receptive field is the entire previous layer. In a convolutional layer, the receptive area can be smaller than the entire previous layer.

The first neural network 114 can be trained to detect, classify, segment and/or translate input data 110 (e.g., by detecting or determining the probabilities of objects, events, words and/or other features, based on the input data 110). For example, the first input layer 116 of neural network 114 can receive the input data 110, process the input data 110 to transform the data to a first intermediate output, and forward the first intermediate output to a first hidden layer 118. The first hidden layer 118 can receive the first intermediate output, process the first intermediate output to transform the first intermediate output to a second intermediate output, and forward the second intermediate output to a second hidden layer 119. The second hidden layer 119 can receive the second intermediate output, process the second intermediate output to transform the second intermediate output to a third intermediate output, and forward the third intermediate output to an output layer 122. The output layer 122 can receive the third intermediate output, process the third intermediate output to transform the third intermediate output to output data 112, and forward the output data 112 (e.g., possibly to a post-processing engine, for rendering to a user, for storage, and so on). The output data 112 can include object detection data, enhanced/translated/augmented data, a recommendation, a classification, and/or segmented data, as examples.

Referring again to FIG. 1A, the AI accelerator 108 can include one or more storage devices 126. A storage device 126 can be designed or implemented to store, hold or maintain any type or form of data associated with the AI accelerator(s) 108. For example, the data can include the input data 110 that is received by the AI accelerator(s) 108, and/or the output data 112 (e.g., before being output to a next device or processing stage). The data can include intermediate data used for, or from any of the processing stages of a neural network(s) 114 and/or the processor(s) 124. The data can include one or more operands for input to and processing at a neuron of the neural network(s) 114, which can be read or accessed from the storage device 126. For example, the data can include input data, weight information and/or bias information, activation function information, and/or parameters 128 for one or more neurons (or nodes) and/or layers of the neural network(s) 114, which can be stored in and read or accessed from the storage device 126. The data can include output data from a neuron of the neural network(s) 114, which can be written to and stored at the storage device 126. For example, the data can include activation data, refined or updated data (e.g., weight information and/or bias information, activation function information, and/or other parameters 128) for one or more neurons (or nodes) and/or layers of the neural network(s) 114, which can be transferred or written to, and stored in the storage device 126.

In some embodiments, the AI accelerator 108 can include one or more processors 124. The one or more processors 124 can include any logic, circuitry and/or processing component (e.g., a microprocessor) for pre-processing input data for any one or more of the neural network(s) 114 or AI accelerator(s) 108, and/or for post-processing output data for any one or more of the neural network(s) 114 or AI accelerator(s) 108. The one or more processors 124 can provide logic, circuitry, processing component and/or functionality for configuring, controlling and/or managing one or more operations of the neural network(s) 114 or AI accelerator(s) 108. For instance, a processor 124 may receive data or signals associated with a neural network 114 to control or reduce power consumption (e.g., via clock-gating controls on circuitry implementing operations of the neural network 114). As another example, a processor 124 may partition and/or re-arrange data for separate processing (e.g., at various components of an AI accelerator 108), sequential processing (e.g., on the same component of an AI accelerator 108, at different times), or for storage in different memory slices of a storage device, or in different storage devices. In some embodiments, the processor(s) 124 can configure a neural network 114 to operate for a particular context, provide a certain type of processing, and/or to address a specific type of input data, e.g., by identifying, selecting and/or loading specific weight, activation function and/or parameter information to neurons and/or layers of the neural network 114.

In some embodiments, the AI accelerator 108 is designed and/or implemented to handle or process deep learning and/or AI workloads. For example, the AI accelerator 108 can provide hardware acceleration for artificial intelligence applications, including artificial neural networks, machine vision and machine learning. The AI accelerator 108 can be configured for operation to handle robotics, internet of things and other data-intensive or sensor-driven tasks. The AI accelerator 108 may include a multi-core or multiple processing element (PE) design, and can be incorporated into various types and forms of devices such as artificial reality (e.g., virtual, augmented or mixed reality) systems, smartphones, tablets, and computers. Certain embodiments of the AI accelerator 108 can include or be implemented using at least one digital signal processor (DSP), co-processor, microprocessor, computer system, heterogeneous computing configuration of processors, graphics processing unit (GPU), field-programmable gate array (FPGA), and/or application-specific integrated circuit (ASIC). The AI accelerator 108 can be a transistor based, semiconductor based and/or a quantum computing based device.

Figure 1B:
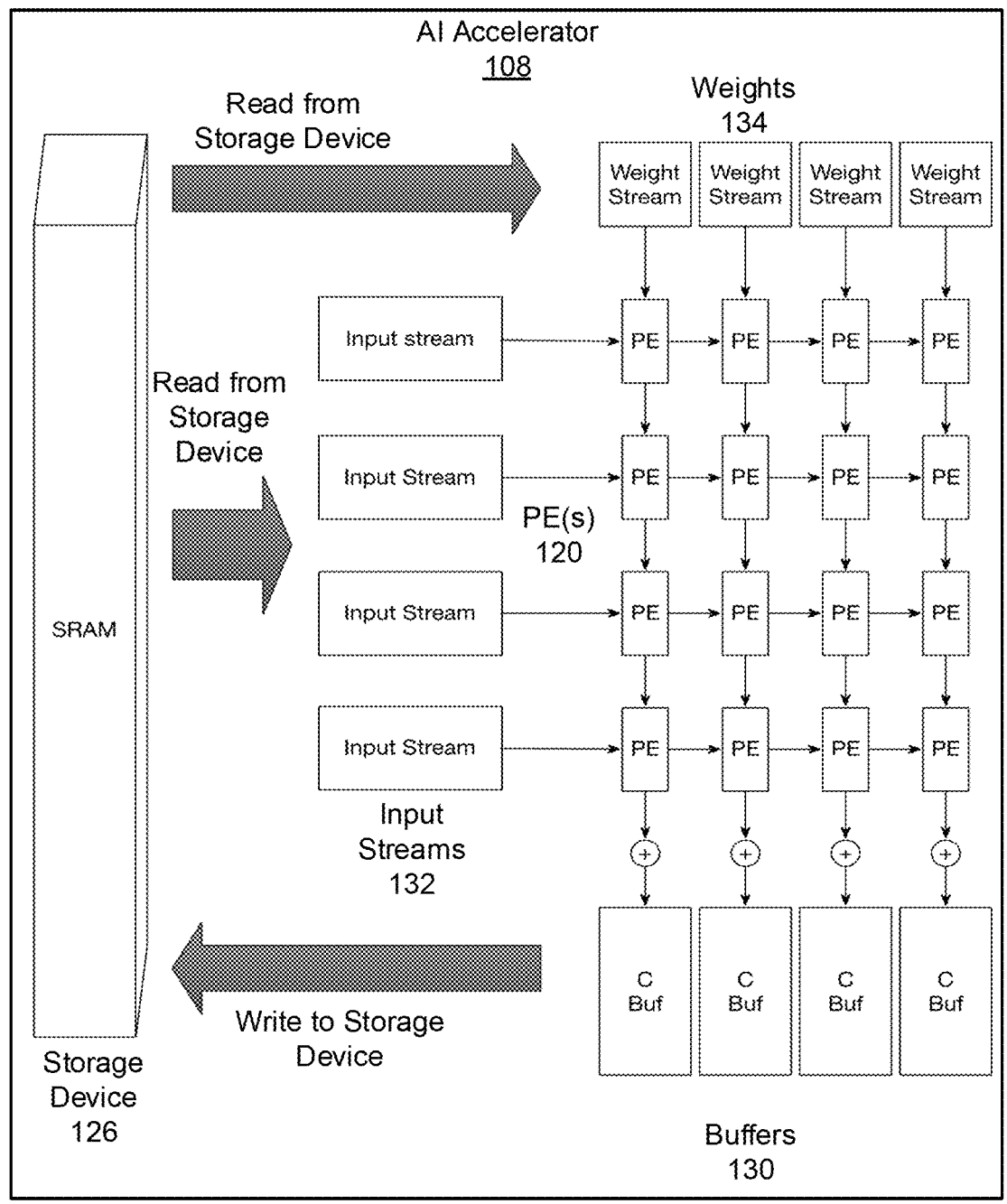
FIG. 1B is a block diagrams of an embodiment of a device for performing AI) related processing, according to an example implementation of the present disclosure.

Referring now to FIG. 1B, an example embodiment of a device for performing AI related processing is depicted. In brief overview, the device can include or correspond to an AI accelerator 108, e.g., with one or more features described above in connection with FIG. 1A. The AI accelerator 108 can include one or more storage devices 126 (e.g., memory such as a static random-access memory (SRAM) device), one or more buffers, a plurality or array of processing element (PE) circuits, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In a neural network 114 (e.g., artificial neural network) implemented in the AI accelerator 108, neurons can take various forms and can be referred to as processing elements (PEs) or PE circuits. The PEs are connected into a particular network pattern or array, with different patterns serving different functional purposes. The PE in an artificial neural network operate electrically (e.g., in a semiconductor implementation), and may be either analog, digital, or a hybrid. To parallel the effect of a biological synapse, the connections between PEs can be assigned multiplicative weights, which can be calibrated or "trained" to produce the proper system output.

PE can be defined in terms of the following equations (e.g., which represent a McCulloch-Pitts model of a neuron):

$$\zeta = \Sigma_i w_i x_i \quad (1)$$

$$y = \sigma(\zeta) \quad (2)$$

Where $\zeta$ is the weighted sum of the inputs (e.g., the inner product of the input vector and the tap-weight vector), and $\sigma(\zeta)$ is a function of the weighted sum. Where the weight and input elements form vectors w and x, the $\zeta$ weighted sum becomes a simple dot product:

$$\zeta = w \cdot x \quad (3)$$

This may be referred to as either the activation function (e.g., in the case of a threshold comparison) or a transfer function. In some embodiments, one or more PEs can be referred to as a dot product engine. The input (e.g., input data 110) to the neural network 114, x, can come from an input space and the output (e.g., output data 112) are part of the output space. For some network networks, the output space Y may be as simple as {0, 1}, or it may be a complex multi-dimensional (e.g., multiple channel) space (e.g., for a convolutional neural network). Neural networks tend to have one input per degree of freedom in the input space, and one output per degree of freedom in the output space.

Referring again to FIG. 1B, the input x to a PE 120 can be part of an input stream 132 that is read from a storage device 126 (e.g., SRAM). An input stream 132 can be directed to one row (horizontal bank or group) of PEs, and can be shared across one or more of the PEs, or partitioned into data portions (overlapping or non-overlapping portions) as inputs for respective PEs. Weights 134 (or weight information) in a weight stream 134 (e.g., read from the storage device 126) can be directed or provided to a column (vertical bank or group) of PEs. Each of the PEs in the column may share the same weight 134 or receive a corresponding weight 134. The input and/or weight for each target PE can be directly routed (e.g., from the storage device 126) to the target PE, or routed through one or more PEs (e.g., along a row or column of PEs) to the target PE. The output of each PE can be routed directly out of the PE array, or through one or more PEs (e.g., along a column of PEs) to exit the PE array. The outputs of each column of PEs can be summed or added at an adder circuitry of the respective column, and provided to a buffer 130 for the respective column of PEs. The buffer(s) 130 can provide, transfer, route, write and/or store the received outputs to the storage device 126. In some embodiments, the outputs (e.g., activation data from one layer of the neural network) that are stored to the storage device 126 can be retrieved or read from the storage device 126, and be used as inputs to the array of PEs 120 for processing (of a subsequent layer of the neural network) at a later time. In some embodiments, the outputs that are stored to the storage device 126 can be retrieved or read from the storage device 126 as output data 112 for the AI accelerator 108.

Figure 1C:
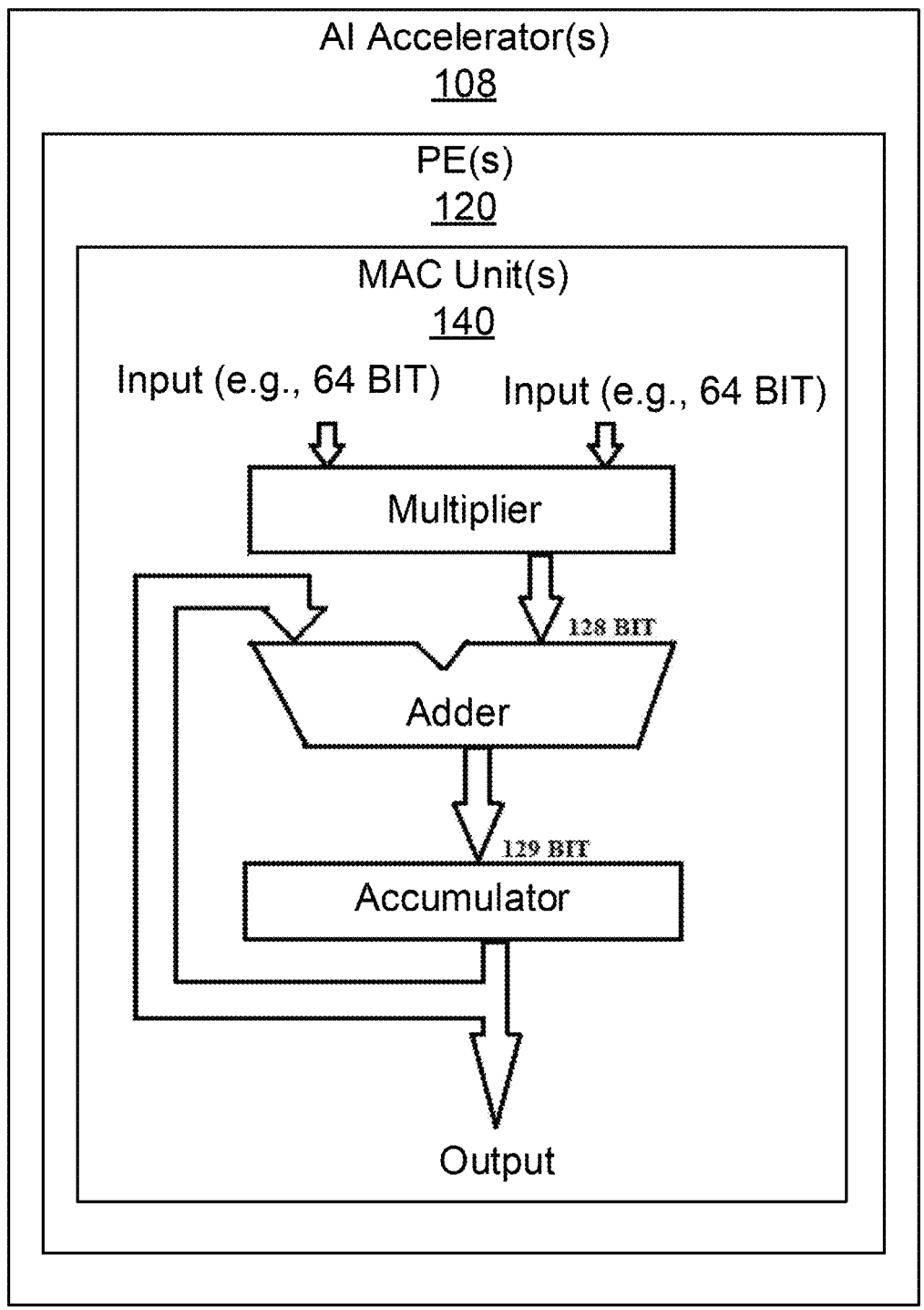
FIG. 1C is a block diagram of an embodiment of a device for performing AI related processing, according to an example implementation of the present disclosure.

Referring now to FIG. 1C, one example embodiment of a device for performing AI related processing is depicted. In brief overview, the device can include or correspond to an AI accelerator 108, e.g., with one or more features described above in connection with FIGS. 1A and 1B. The AI accelerator 108 can include one or more PEs 120, other logic or circuitry (e.g., adder circuitry), and/or other structures or constructs (e.g., interconnects, data buses, clock circuitry, power network(s)). Each of the above-mentioned elements or components is implemented in hardware, or at least a combination of hardware and software. The hardware can for instance include circuit elements (e.g., one or more transistors, logic gates, registers, memory devices, resistive elements, conductive elements, capacitive elements, and/or wire or electrically conductive connectors).

In some embodiments, a PE 120 can include one or more multiply-accumulate (MAC) units or circuits 140. One or more PEs can sometimes be referred to as a MAC engine. A MAC unit is configured to perform multiply-accumulate operation(s). The MAC unit can include a multiplier circuit, an adder circuit and/or an accumulator circuit. The multiply-accumulate operation computes the product of two numbers and adds that product to an accumulator. The MAC operation can be represented as follows, in connection with an accumulator a, and inputs b and c:

$$a \leftarrow a + (b \times c) \quad (4)$$

In some embodiments, a MAC unit 140 may include a multiplier implemented in combinational logic followed by an adder (e.g., that includes combinational logic) and an accumulator register (e.g., that includes sequential and/or combinational logic) that stores the result. The output of the accumulator register can be fed back to one input of the adder, so that on each clock cycle, the output of the multiplier can be added to the register.

As discussed above, a MAC unit 140 can perform both multiply and addition functions. The MAC unit 140 can operate in two stages. The MAC unit 140 can first compute the product of given numbers (inputs) in a first stage, and forward the result for the second stage operation (e.g., addition and/or accumulate). An n-bit MAC unit 140 can include an n-bit multiplier, 2n-bit adder, and 2n-bit accumulator.

Figure 1D:
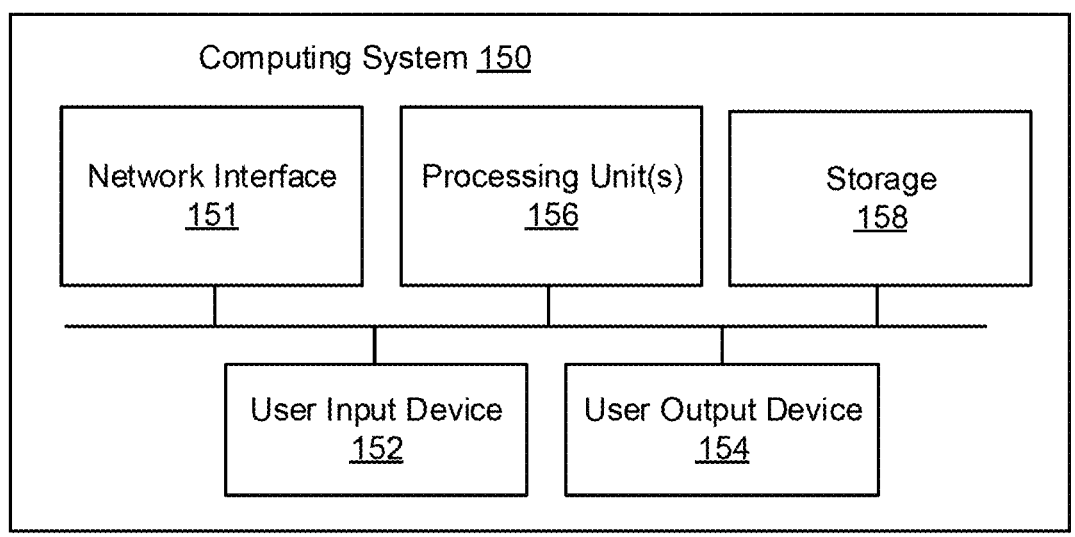
FIG. 1D is a block diagram of a computing environment according to an example implementation of the present disclosure.

Various systems and/or devices described herein can be implemented in a computing system. FIG. 1D shows a block diagram of a representative computing system 150. In some embodiments, the system of FIG. 1A can form at least part of the processing unit(s) 156 of the computing system 150. Computing system 150 can be implemented, for example, as a device (e.g., consumer device) such as a smartphone, other mobile phone, tablet computer, wearable computing device (e.g., smart watch, eyeglasses, head mounted display), desktop computer, laptop computer, or implemented with distributed computing devices. The computing system 150 can be implemented to provide VR, AR, MR experience. In some embodiments, the computing system 150 can include conventional, specialized or custom computer components such as processors 156, storage device 158, network interface 151, user input device 152, and user output device 154.

Network interface 151 can provide a connection to a local/wide area network (e.g., the Internet) to which network interface of a (local/remote) server or back-end system is also connected. Network interface 151 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 152 can include any device (or devices) via which a user can provide signals to computing system 150; computing system 150 can interpret the signals as indicative of particular user requests or information. User input device 152 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 154 can include any device via which computing system 150 can provide information to a user. For example, user output device 154 can include a display to display images generated by or delivered to computing system 150. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 154 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 156 can provide various functionality for computing system 150, including any of the functionality described herein as being performed by a server or client, or other functionality associated with message management services.

It will be appreciated that computing system 150 is illustrative and that variations and modifications are possible. Computer systems used in connection with the present disclosure can have other capabilities not specifically described here. Further, while computing system 150 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Implementations of the present disclosure can be realized in a variety of apparatus including electronic devices implemented using any combination of circuitry and software.

B. Methods and Devices for Localization and Classification of Content in a Data Set Disclosed herein include embodiments of a system, a method, and a device for localization and classification of content in a data set. A device can include or implement at least one neural network, and can localize and classify different portions of a data set based in part on content within the respective portion of the data set. In some embodiments, the data set can include, but is not limited to, a video file, a text file, an image file and/or an audio file. The device can localize (e.g., temporally localize) different portions of the data set to identify key features, important features or other forms of noteworthy characteristic of the content within the respective portion (e.g., time period or window) of the data set. The data set can be received in different formats, for example, as a sequence of inputs to be provided to a recurrent neural network (RNN) of the neural network. The device can apply a learned attention vector to a last layer of the RNN, at various temporal points in the data set, to produce a sequence of values. For example, the learned attention vector can be applied to each step or activation of the last layer of the RNN to generate the sequence of values. The device can perform a probability determination on each of the values to determine a probability distribution, or at least one attention score corresponding to each value in the sequence of values. The attention score can be used to determine a localization (e.g., a characteristic localized to a portion or time period) of the data set. For example, portions of the data set having high attention scores or attention scores over a threshold value can indicate presence of a key feature, important feature or a noteworthy characteristic of content within the respective portion of the data set. The device can apply the attention scores (e.g., as weights) to each step or activation of the last layer of the RNN to generate weighted values corresponding to the different portions of the data set. The device can sum or combine the weighted values and provide the summed value to a feedforward neural network (NN) to determine a classification for the data set.

The data set can be provided to the RNN in different or multiple formats to provide multiple inputs to the RNN. In some embodiments, the RNN can receive two or more data sets simultaneously or concurrently and the RNN can process the data sets together. For example, in some embodiments, the data sets can include an image stream and a word stream. The image stream and word stream can correspond to the same data set, for example, the word stream can correspond to a script (e.g., closed caption information or commentary) for the image stream. The device can synchronize different portions of the image stream with the different portions of the word stream based in part on a time value or sequence value. For example, a first portion of the word stream can have a first time value that is the same as or corresponds to a first time value of a first portion of the image stream. In some embodiments, the device can combine the synchronized individual portions of the image stream and the word stream, and can provide them to the RNN. The RNN can generate values for each portion or time period of the image stream and word stream. The values can correspond to activations of the last layer of the RNN. The device can perform a dot product between the learned attention vector and the individual activations of the last layer of the RNN to generate a sequence of values. The sequence of values can be normalized to generate a probability distribution. The probability distribution can correspond to or include attention scores for the corresponding portions or time periods of the image stream and the word stream.

The device can model the data set to classify or label the data set. For example, the device can perform a weighted adjustment by respectively applying or multiplying the attention scores to the individual activations of the last layer of the RNN to generate a sequence or set of values. For example, each individual activation vector can be multiplied by (or weighted by) the attention score (e.g., weight) for the corresponding portion of the image stream and word stream. The weighted vectors (e.g., weighted RNN activations) can be summed and provided to a feedforward NN to determine a classification for the data set. Thus, the subject matter of this application can classify an entire data set and identify or localize important features within the data set that may have caused the classification assigned to the data set. For example, different images, content, objects, behaviors, characteristics and/or actions within a video stream can be localized (e.g., to one or more identifiable and/or reviewable portions or time periods of the data set) to identify, justify or explain why a respective data set (e.g., video segment) was assigned a particular classification. The data set can be classified based on individual portions of the data set, and those individual portions can be localized to explain or highlight the reasoning for the classification.

Figure 2A:
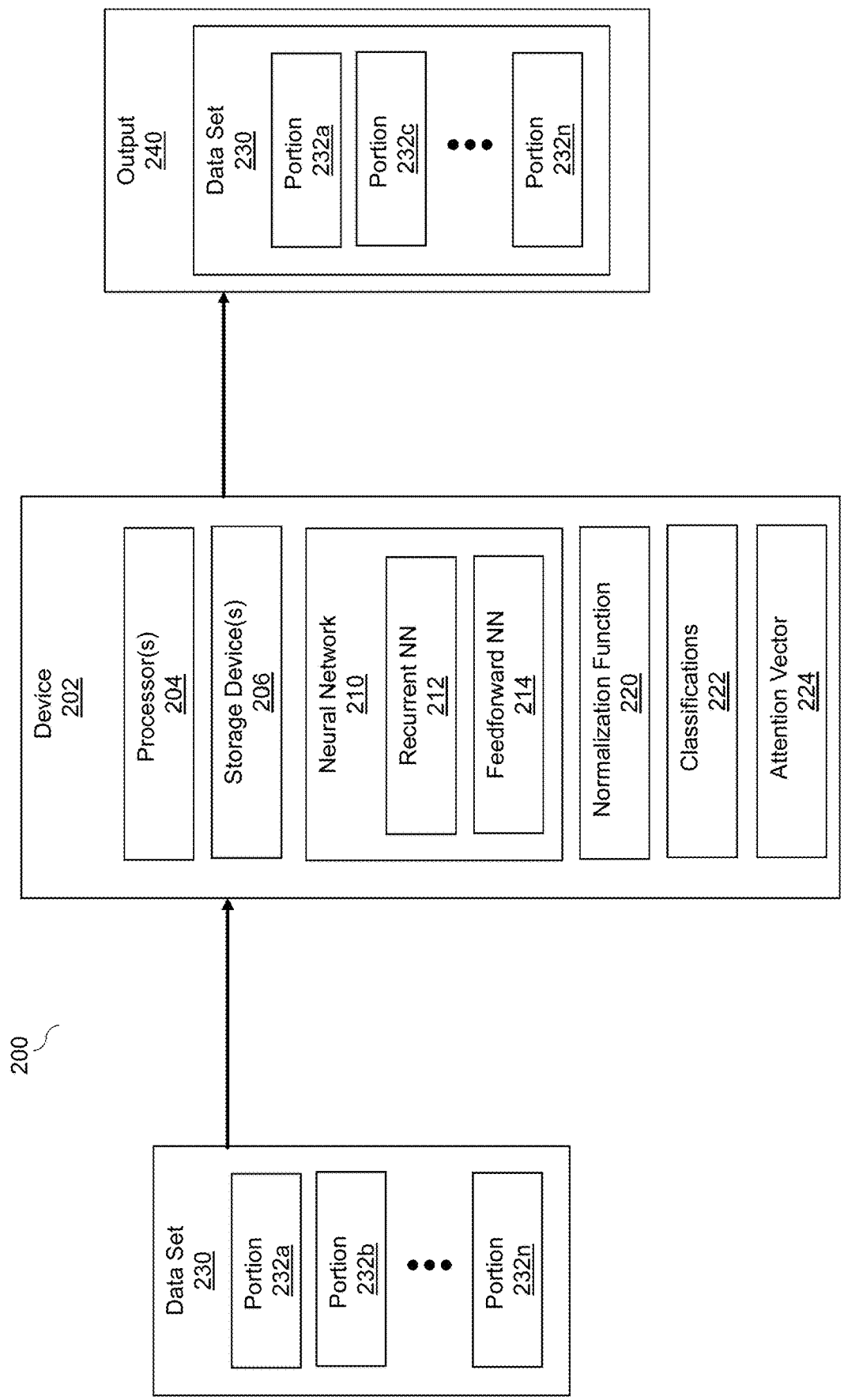
FIG. 2A is a block diagram of a system for localization and classification of content in a data set, according to an example implementation of the present disclosure.

Referring now to FIG. 2A, an embodiment of a system 200 for localization and classification of content in a data set is depicted. In brief overview, the system 200 can include a device 202 having at least one neural network 210 to receive portions 232a-232n of a data set 230, and to localize and classify the different portions 232a-232n based in part on the content within the respective data set 230. For example, the neural network 210 can include a plurality of neural networks, including but not limited to, a recurrent neural network (RNN) 212 and a feedforward neural network (NN) 214 that can be used to perform the localization and classification, respectively. In some embodiments, the device 202 can generate an output 240 that corresponds to the data set 230 received, that can include one or more portions 232 flagged, changed within the data set 230 or removed based in part on the content (e.g., content localization and/or classification) within the respective data set 230.

The device 202 can include one or more processors 204 such as but not limited to processor(s) 124 described above with respect to FIG. 1A. In some embodiments, the device 202 can include the AI accelerator 108 described above with respect to FIG. 1B. In some embodiments, the device 202 can include one or more processing elements (PEs) of an AI accelerator system, such as PE(s) 120 of FIG. 1B. The device 202 can be or include a MAC unit 140 (for example as described in connection with FIG. 1C). The device 202 can be configured to perform AI related processing. For example, the device 202 can be configured to provide output data used for configuring, tuning, training and/or activating a neural network, such as a neural network 114 of the AI accelerator(s) 108 of FIG. 1A. In some embodiments, the device 202 can be a component of or part of computing system 150 described above with respect to FIG. 1D.

The device 202 can include one or more storage devices 206 (e.g., memory). For example, the device 202 can include a storage device 206 or memory communicatively coupled with one or more processors 204. The memory can include a static random access memory (SRAM) as an example. In some embodiments, the storage device 206 or memory can include, be the same as or substantially similar to storage device 126 of FIGS. 1A-1B or storage 158 of FIG. 1D.

The device 202 can include one or more neural networks 210. In some embodiments, the neural network 210 can include a recurrent neural network 212 (RNN), a feedforward neural network 214 (NN) or a combination of a recurrent neural network 212 (RNN) and a feedforward neural network 214 (NN). The neural network 210 can receive input data, including a data set 230, to localize, classify or identify localities within the data set 230 or portions 232 of the data set 230 based in part on the content included within the respective individual portion 232 or groups of portions 232. In some embodiments, the neural network 210 can classify an entire data set 230 based in part on the classification(s) on the individual portions 232 or groups of portions 232 of the data set 230. The neural network 210 can label or highlight individual portions 232 or groups of portions 232 of a data set 230 to suggest an interesting or characteristic segment of the respective data set 230. The neural network 210 can identify or indicate why an individual portion 232 or groups of portions 232 of a data set 230 are classified into a particular classification or group. In some embodiments, the neural networks 210 (including RNN 212 and/or feedforward NN 214) can be the same as or substantially similar to neural network 114 of FIG. 1A.

The RNN 212 can include or correspond to a class of artificial neural networks. The RNN 212 can include a plurality of nodes that are connected to form a directed graph along a temporal sequence (e.g., a sequence arranged in time). The RNN 212 can include an input layer, one or more hidden layers and an output layer. For example, the input layer can be the same as or substantially similar to input layer 116 of FIG. 1A, the one or more hidden layers can be the same as or substantially similar to hidden layers 118, 119 of FIG. 1A and the output layer can be the same as or substantially similar to output layer 122 of FIG. 1A. In some embodiments, the RNN 212 can include a bidirectional RNN. For example, the RNN 212 can include two or more hidden layers with nodes of the hidden layers connected in two directions (e.g., opposite directions, forward and backward directions, positive and negative directions) to provide feedback connections. Thus, the RNN 212 can generate output data 240 corresponding to information from past and future states, or a combination of past and future states. In some embodiments, the RNN 212 can be configured to recognize a data set's sequential or temporal characteristics (e.g., characteristics of the portions 232) and use patterns to predict the next likely portion 232 of the data set 230. In some embodiments, the outputs of the last layer of the RNN 212 can include or be referred to activations 213. In some embodiments, the outputs of a first or a second hidden layer of the RNN 212 can include or be referred to activations 213.

The feedforward NN 214 can include or correspond to a class of artificial neural networks. The feedforward NN 214 can include a plurality of nodes that are connected to form a directed graph along a temporal sequence. In some embodiments, the feedforward NN 214 can include a single-layer perceptron network or multi-layer perceptron. The feedforward NN 214 can receive a data set 230 or portions 232 of a data set 230, and can process the data set 230 or portions 232 through at least one layer of nodes of a hidden layer to the output nodes. The feedforward NN 214 can include an input layer, one or more hidden layers and an output layer. For example, the input layer can be the same as or substantially similar to input layer 116 of FIG. 1A, the one or more hidden layers can be the same as or substantially similar to hidden layers 118, 119 of FIG. 1A, and the output layer can be the same as or substantially similar to output layer 122 of FIG. 1A. In some embodiments, the feedforward NN 214 can be configured to recognize a data set's sequential or temporal characteristics (e.g., characteristics of the portions 232) and can use patterns to predict the next likely portion 232 of the data set 230.

The device 202 can include a normalization function 220. The normalization function 220 can include or be implemented in hardware, or at least a combination of hardware and software. In some embodiments, the normalization function 220 can be configured to receive a set of X values (e.g., a vector of X values) and normalize the set of values into a probability distribution having X probabilities, a probability distribution corresponding to a list of potential outcomes or decisions, or normalize and turn the set of values into probabilities that sum to 1, for instance. For example, the normalization function 220 can generate one or more attention scores 217 responsive to performing a normalization on a sequence of values. The normalization function 220 can apply or execute a softmax function, softmax activation or normalized exponential function on a sequence of values to generate attention scores 217. In some embodiments, the normalization function 220 can reorganize a data set 230 to remove or reduce a redundancy of the data and logically relate one or more data dependencies in the data set 230.

The device 202 can include, generate, store or maintain one or more classifications 222. In some embodiments, the classifications 222 can be generated by the feedforward NN 214 or correspond to an output from the feedforward NN 214. For example, the classifications 222 can correspond to or describe one or more properties (or characteristics) of a respective portion 232 of the data set 230. The classifications 222 can be used to classify, categorized or label one or more portions 232 of a data set 230 based in part on the one or more portions 232 forming the data set 230. In some embodiments, various portions 232 in a common or same classification 222 can include one or more common, similar or same properties. For example, in some embodiments, a first group of portions 232 in a first classification 222 can each include the same phrase, same type of play, same type of action, same noise, same mood, style or design, or same feature. In some embodiments, the classifications 222 can label or flag the plurality of portions 232 of the data set 230 with a first label or a second label based on an output of the feedforward NN 214. For example, the labels can include "yes" or "no" to indicate whether to include or remove one or more portions 232 of a data set 230 in an output 240. In some embodiments, the labels can include a number or order of placement to re-arrange the portions 232 of a data set 230 or change a position of one or more portions 232 of a data set 230 to generate an output 240. In some embodiments, the labels can include or indicate a type of content or type of data file of a particular portion 232 or group of portions 232 of a data set 230.

The data set 230 can include data or information provided to the neural network 210 for localization and/or classification. In some embodiments, the data set 230 can be partitioned or segmented in time into one or more portions 232 that are arranged in time. The data set 230 can include portions 232 or components that are partitioned or segmented in time, and/or that are arranged in time to form the data set 230. The data set 230 can include a data stream, packets of data or signals used to transmit and/or receive information. In some embodiments, the data set 230 can include or be the same as input data 110 described above with respect to FIG. 1A. In some embodiments, the data set 230 can include an image file (e.g., image stream of image frames for instance), a video file (e.g., video stream of image or video frames for instance), a text file (e.g., word stream or sequence of textual characters), an audio file (e.g., audio stream of audio frames or audio signals) or any combination of an image file (e.g., image stream), a video file (e.g., video stream), a text file (e.g., word stream), and/or an audio file (e.g., audio stream). In some embodiments, the data set 230 can include an image stream and a word stream. The portions 232 can include or correspond to segments or packets of the respective data set 230. For example, in one embodiment corresponding to a text file or word stream, the portions 232 can correspond to individual words, symbols, characters or alphanumeric characters within the text file or word stream. In one embodiment corresponding to an image file or image stream, the portions 232 can correspond to individual images (image frames) within the image file or image stream.

The output 240 can include or correspond to the data set 230. For example, the output 240 can include a modified version of the data set 230 received by the device 202. In some embodiments, the output 240 can be the same as the data set 230 received by the device 202. The output 240 can include the data set 230 with one or more portions 232. In some embodiments, an order of the portions 232 can be modified or rearranged from the original order of the portions 232 of the data set 230 received at the device 202. In some embodiments, one or more portions 232 can be removed or obfuscated from the original set of portions 232 of the data set 230 received at the device 202 to generate the output 240. In some embodiments, the output 240 can include one or more portions 232 that have been localized, classified and/or labeled using RNN 212 and feedforward NN 214 to generate the output 240. In some embodiments, the device 202 can generate the output 240 to include portions 232 of a data set 230, for example corresponding to a news interview, that include important topics or topics of interest and/or remove portions 232 corresponding to unimportant topics or having no content and thus, modify the original data set 230 to a condensed version. In some embodiments, the device 202 can generate the output 240 to include portions 232 of a data set 230, for example corresponding to a sports video, that include important plays or highlights and/or remove portions 232 corresponding to unimportant plays or having no action and thus, modify the original data set 230 to a condensed version.

The device 202 can include a learned (or predetermined) attention vector 224 or context vector. The attention vector 224 can be developed and/or implemented using hardware, or at least a combination of hardware and software. The attention vector 224 can include or correspond to a learned vector that can be trained using previous portions 232 of the data set 230, other data sets 230, portions 232 of other data sets 230 or training data to predict or determine a future or subsequent portion 232 of a data set 230 based in part on one or more previous portions 232 of the data set 230, other data sets 230 or portions 232 of other data sets 230. In some embodiments, the attention vector 224 can be applied to one or more outputs of the RNN 212 or activations 213 of the RNN 212 and can be used to generate a probability distribution or weighted values (e.g., attention weights) to predict or determine a future or subsequent portion 232 of a data set 230. The attention vector 224 can be applied to the one or more hidden layers or last layers of the RNN 212 to cause or provide activations 213 of the RNN 212 that provide a sequence of values. In some embodiments, the attention vector 224 can generate a sequence of values, and the size or weight of a respective value can correspond to an importance of the respective value within the sequence of values. In some embodiments, the attention vector 224 can include a single layer perceptron. In some embodiments, the attention vector 224 can be used to generate normalized attention scores 217 to localize portions 232 of a data set 230 or identify (e.g., highlight) important, characteristic, or particular portions 232 of a data set 230.

Figure 2B:
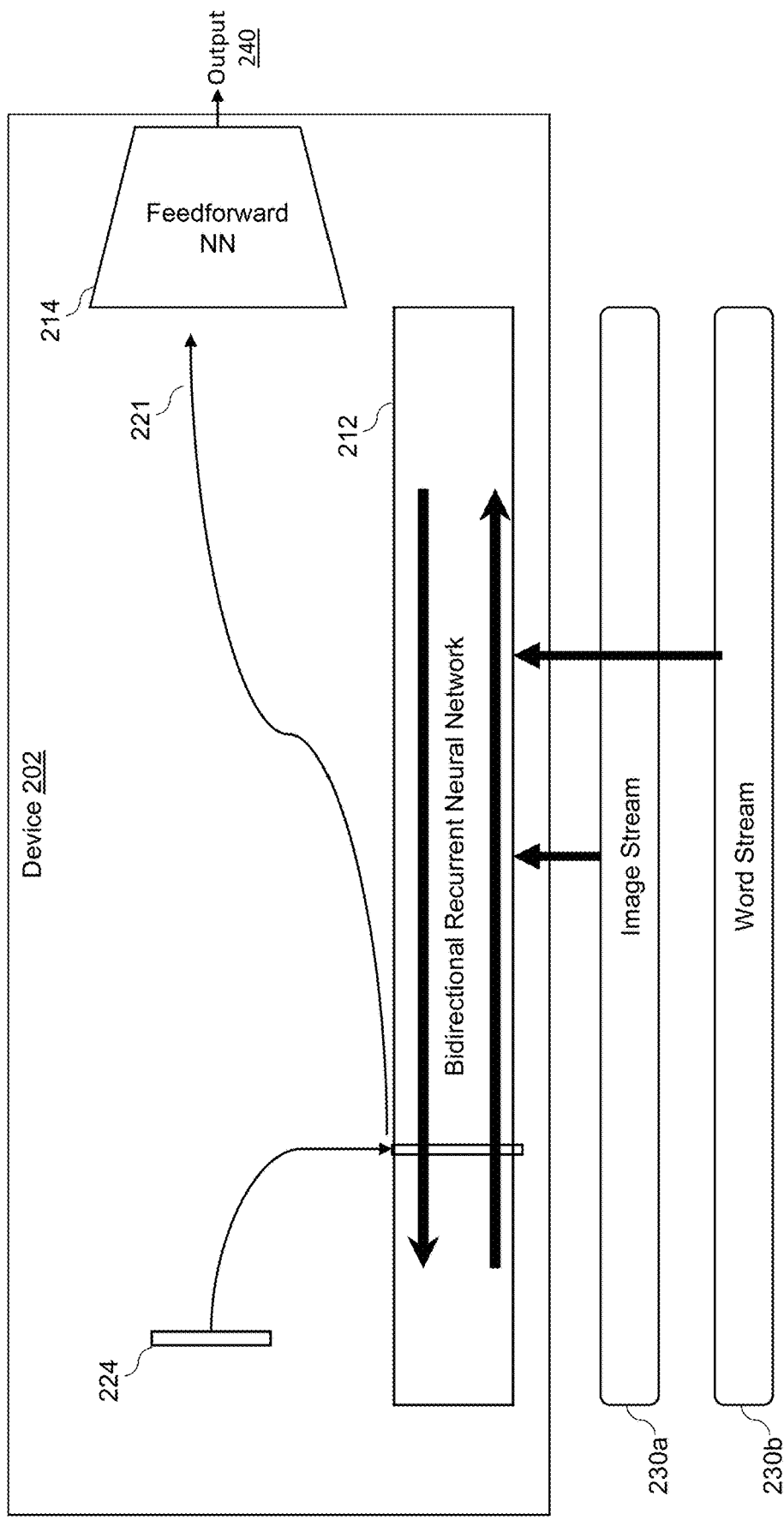
FIG. 2B is a block diagram of method for localizing and classification of content in a data set, according to an example implementation of the present disclosure.
Figure 2C:
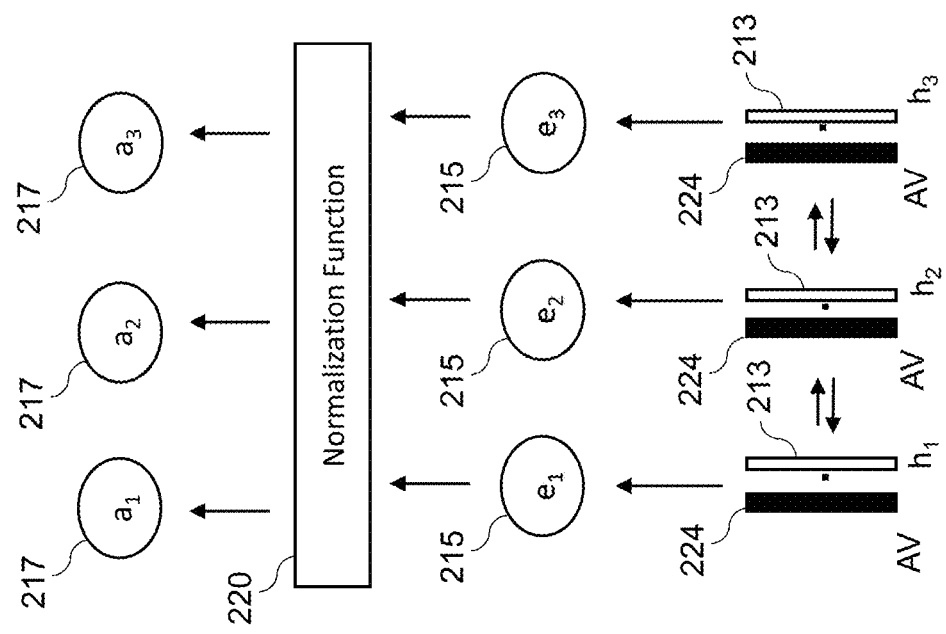
FIG. 2C is a block diagram of a system for localization of content in a data set, according to an example implementation of the present disclosure.
Figure 2D:
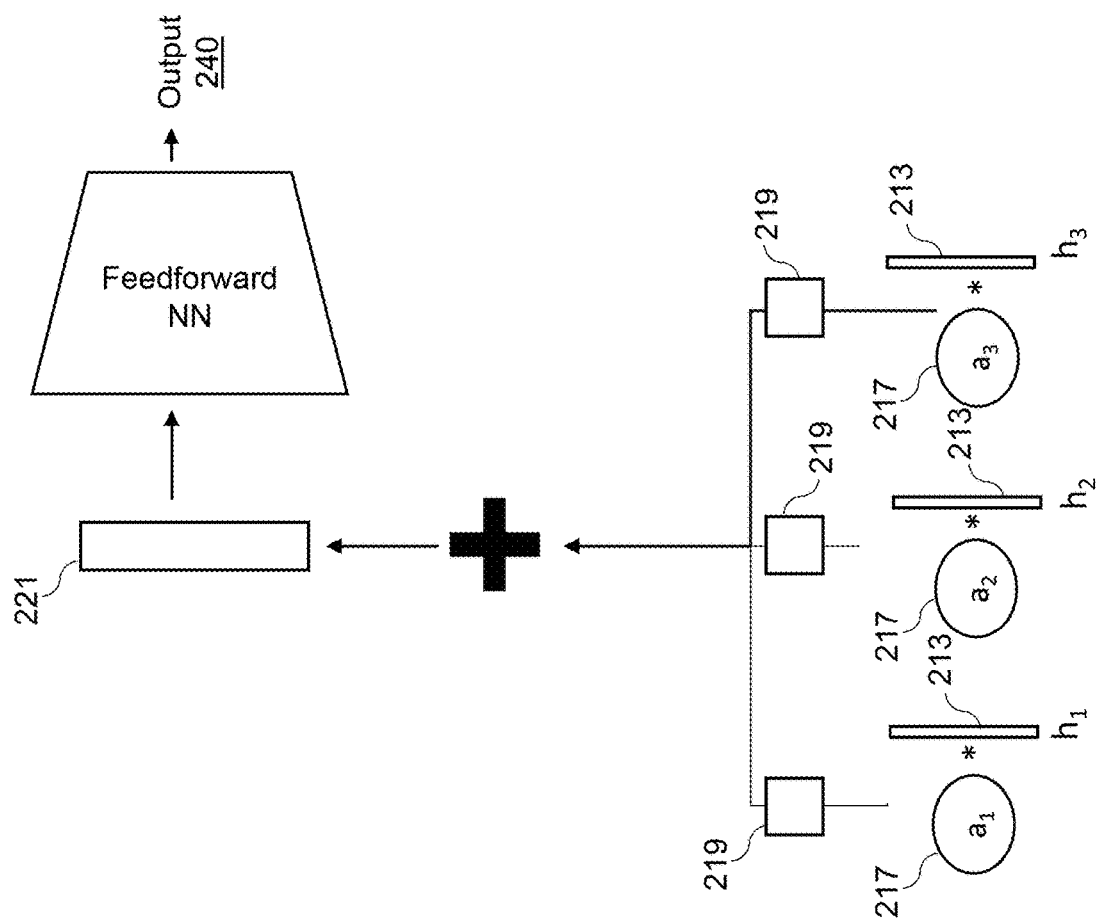
FIG. 2D is a block diagram of a system for classification of content in a data set, according to an example implementation of the present disclosure.

Referring now to FIGS. 2B-2D, embodiments of example methods for localization and classification of content in a data set are depicted. In brief overview, FIG. 2B provides a flow diagram of an overall method for localization and classification of content in a data set including methods illustrated in FIGS. 2C and 2D. FIG. 2C provides a flow diagram of a method for localization of content in a data set and FIG. 2D provides a flow diagram of a method for classification of content in a data set. In some embodiments, the device 202 as described herein can perform localization (e.g., FIG. 2C) in conjunction with classification (e.g., FIG. 2D) to identify specific content within the portions 232 of a data set 230. The localization methods and classification methods can form a joint processing technique to first identify or localize specific content within the portions 232 and then subsequently (or at the same time) classify the portions 232 based in part on the content within the portions 232. For example, the device 202 can use the outputs of the localization methods, as illustrated in FIG. 2C, as inputs to classification methods, as illustrated in FIG. 2D. The device 202 can perform the localization of the portions 232 of the data set 230 to generate the attention scores 217. The attentions scores 217 can be used as inputs or weights to perform or drive classification on some or all portions 232 of the data set 230. The device 202 can use the attention scores 217 to further process the portions 232 of the data set 230 to classify individual portions 232 of the data set 230 based in part on the content within the respective portions 232.

For example, and referring to FIG. 2B, the device 202 can include an RNN 212 to receive one or more data sets 230 and generate activations 213, an attention vector 224 to apply attention weights to the activations 213 from the RNN 212, and a feedforward NN 214 to receive the weighted activations 213 and generate an output 240 or decision. A processor of the device 202 can train the attention vector 224. The attention vector 224 may be trained to help identify portions of the data set having a particular characteristic or property, for instance. As illustrated in FIG. 2B, the RNN 212 can receive a first data set 230*a* and a second data set 230*b*. The first data set 230*a* can include an image stream and the second data set 232*b* can include a word stream, by way of illustration.

In some embodiments, the first and second data sets 230*a*, 230*b* can be synchronized before being provided to the RNN 212. For example, the second data set 230*b* can include a word stream that is a script, text or dialogue of the first data set 230*a* corresponding to the image stream. In some embodiments, portions 232 of the second data set 230*b* can include words spoken during a particular portion 232, image or scene from the first data set's image stream. The device 202 can synchronize the first data set 230*a* and the second data set 230*b* such that the portions 232 of the first data set 230*a* are aligned with or synchronized with the corresponding portions 232 of the second data set 230*b* (e.g., having the same timestamps or sequence identifiers). In some embodiments, a first portion 232 of the first data set 230*a* can be aligned with or synchronized with a first portion 232 of the second data set 230*b*, a second portion 232 of the first data set 230*a* can be aligned with or synchronized with a second portion 232 of the second data set 230*b* and an Nth portion 232 of the first data set 230*a* can be aligned with or synchronized with an Nth portion 232 of the second data set 230*b*. In some embodiments, the portions 232 of the first and second data sets 230*a*, 230*b* can be synchronized based in part on a time value or a sequence value of the respective portions 232. For example, the portions 232 of the first and second data sets 230*a*, 230*b* can be synchronized based in part on an order or sequence in which the portions 232 of the data sets 230*a*, 230*b* were received and/or arranged.

In some embodiments, a processor of the device 202 can provide the data set to the RNN. The synchronized portions 232 of the first data set 230*a* and the second data set 230*b* can be provided to the RNN 212. The RNN 212 can include a bi-directional RNN and the bi-directional RNN can include a first hidden layer and a second hidden layer. The RNN 212 can generate a plurality of activations 213 based on the first data set 230*a* and the second data set 230*b*. The activations 213 can include or correspond to at least one value from a layer of RNN 212. In some embodiments, the activations 213 can include or correspond to at least one value from the first hidden layer or the second hidden layer of the RNN 212. In some embodiments, the activations 213 of the second hidden layer and can include a combination of a value corresponding to at least one portion of the first data set 230*a*, the second data set 230*b* and a previous hidden state, a value from the first hidden layer or any combination of a portion of the first data set 230*a* and a portion of the second data set 230*b* and a previous hidden state or a value from the first hidden layer. In some embodiments, the activations 213 of the second hidden layer can include or provide a combination of a weighted input and a previous hidden state or a value from the first hidden layer. In some embodiments, the activations 213 can correspond to outputs of the first hidden layer or the second hidden layer of the RNN 212.

In some embodiments, the device 202 can apply an attention vector 224 to activations 213. For example, and now referring to FIG. 2C, a block diagram of a method for localizing content within a data set is provided. The activations 213 can correspond to a particular step or time value of the one or more data sets 230 provided to the RNN 212. The device 202 can apply the attention vector 224 to each time step or each activation 213 for each time step to generate a sequence of values 215 or numbers. In some embodiments, a dot product can be performed between the attention vector 224 and the individual activations 213 (or neural network layer) of the RNN 212 to generate the sequence of values 215. The sequence of values 215 can correspond to a probability distribution indicating where the RNN 212 or device 202 is (or should be) paying attention or focusing on. In some embodiments, a processor of the device 202 can generate attention scores. In some embodiments, the attention vector 224 can be trained with a training set having certain properties such that the sequence of values 215 generated indicates or highlights portions 232 of the data set 230 having the certain properties or having properties similar to or associated with the certain properties. The sequence of values 215 can correspond to or include a probability distribution used by the device 202 to predict or determine a future or subsequent portion 232 of a data set 230.

A processor of the device 202 can localize portions of the data set. Referring to (312) the device 202 can generate weighted vectors (e.g., weighted RNN activations). In some embodiments, the device 202 can normalize the sequence of values 215 using a normalization function 220. For example, the device 202 can apply a normalization function 220 to the sequence of values 215 to generate a sequence of attention scores 217. The sequence of attention scores 217 can include or correspond to a probability distribution. For example, a high value, high distribution (e.g., a distribution value above a threshold in the probability distribution) can indicate that the neural network 210 or device 202 identifying, highlighting and/or focusing on the corresponding portion 232 of the data set 230. In some embodiments, the attention scores 217 can be used to localize, flag or highlight one or more portions 232 of a data set 230 for further inspection or review. In some embodiments, the localized attention scores 217 can be combined and/or used to classify the portions 232 of the data set 230.

For example, and now referring to FIG. 2D, a block diagram of a system for classifying content within a data set is provided. In some embodiments, the attention scores 217 can be applied to the activations 213 from the last layer of the RNN 212 or second hidden layer of the RNN 212. For example, the device 202 can apply the activation 213 for a portion 232 of the plurality of portions 232 of the data set 230 to the attention score 217 for the same portion 232 of the plurality of portions 232 of the data set 230. In some embodiments, the device 202 can generate weighted vectors 219. The weighted vectors 219 can include weighted RNN activations, weighted scores (e.g., arranged in a vector format), weighted elements (e.g., arranged in a vector format), etc. In some embodiments, a dot product can be taken between the activation 213 for a respective portion 232 and the attention score 217 generated for the same respective portion 232 of the data set 230 to generate weighted vectors 219. The device 202 can generate a weighted vector 219 corresponding to each portion 232 of the data set 230.

Referring to (314), and in some embodiments, the device 202 can perform summation. In some embodiments, the device 202 can sum or combine the weighted vectors 219 to generate a combined score 221. For example, the device 202 can combine the weighted vectors 219 for the portions 232 of the data set 230 to generate the combined score 221 or summed score 221. In some embodiments, the device 202 can include or execute an adder function to sum or combine the weighted vectors 219. The combined score 221 can include or correspond to a weighted sum of the weighted vectors 219 generated for the portions 232 of the data set 230, a total value of the weighted vectors 219 generated for the portions 232 of the data set 230, or a weighted sum of the plurality of portions 232 of the data set 230. The device 202 can provide a combined score to the feedforward NN. The device 202 can provide the combined score 221 to a feedforward NN 214 of the neural network 210. In some embodiments, the device 202 can provide the combined score 221 as an input to the feedforward NN 214 to determine one or more classifications 222 of the portions 232 of the data set 230. In some embodiments, the device 202 can generate a classification. For example, the feedforward NN 214 can generate one or more classifications 222 for the plurality of portions 232 of the data set 230 based in part on the properties and content of plurality of portions 232. The output of the feedforward NN 214 can include or correspond to one or more classifications 222. The classifications 222 can include or correspond to properties of content included within the portions 232 of the data set 230.

The device 202 can use the classifications 222 to identify particular portions 232 of the data set 230 for further review based in part on the properties of the respective portions 232. The device 202 can use the classifications 222 to identify particular content included within the portions 232 of the data set 230 for further review or to suggest interesting portions 232 of the data set 230. In some embodiments, the classifications 222 can include portions 232 to remove, portions 232 to highlight, portions 232 having particular features, portions 232 having particular words, phrases, language (e.g., type of language), content, audio, sounds, actions or any combination of words, phrases, language (e.g., type of language), content, audio, sounds, or actions. For example, the classifications 222 can be used to reduce a review time of a data set 230 (e.g., video stream) such that device 202 or user of the device 202 can review only the portions 232 indicated as important or needing review based in part on the classification 222 applied to the respective portions 232. In some embodiments, if the device 202 or user of the device 202 is attempting to identify specific content within a data set 230, the classification 222 can be used to indicate to the device 202 or the user of the device 202 portions 232 that include the specific content or may include the specific content such that the device 202 or user of the device 202 does not need to review of the entire original data set 230.

Figure 3A:
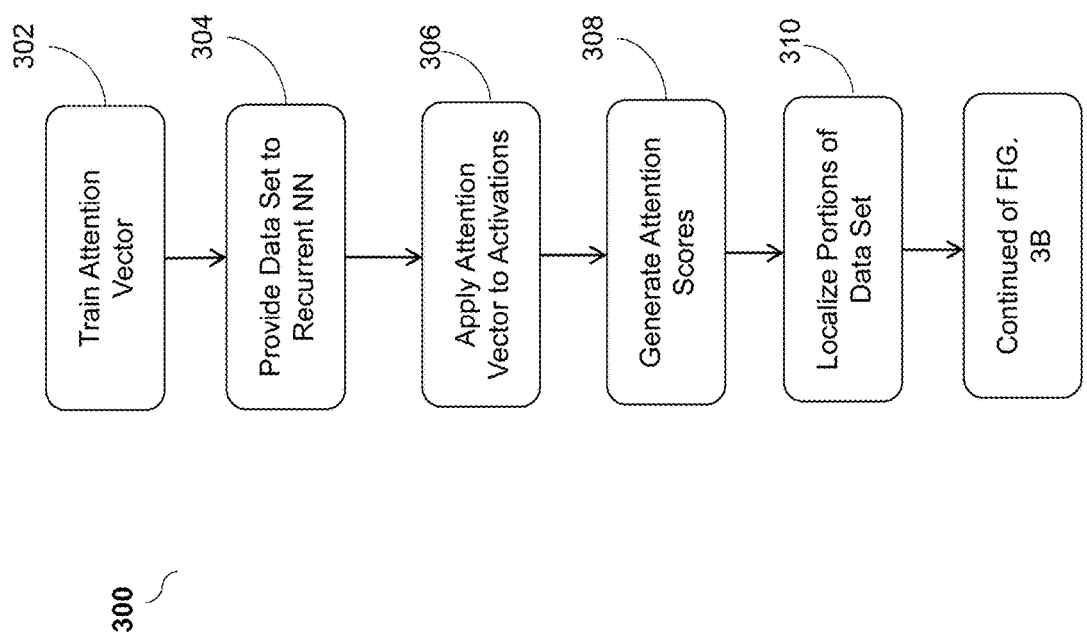
FIGS. 3A-3B include a flow chart illustrating a process or method for localization and classification of content in a data set, according to an example implementation of the present disclosure.
Figure 3B:
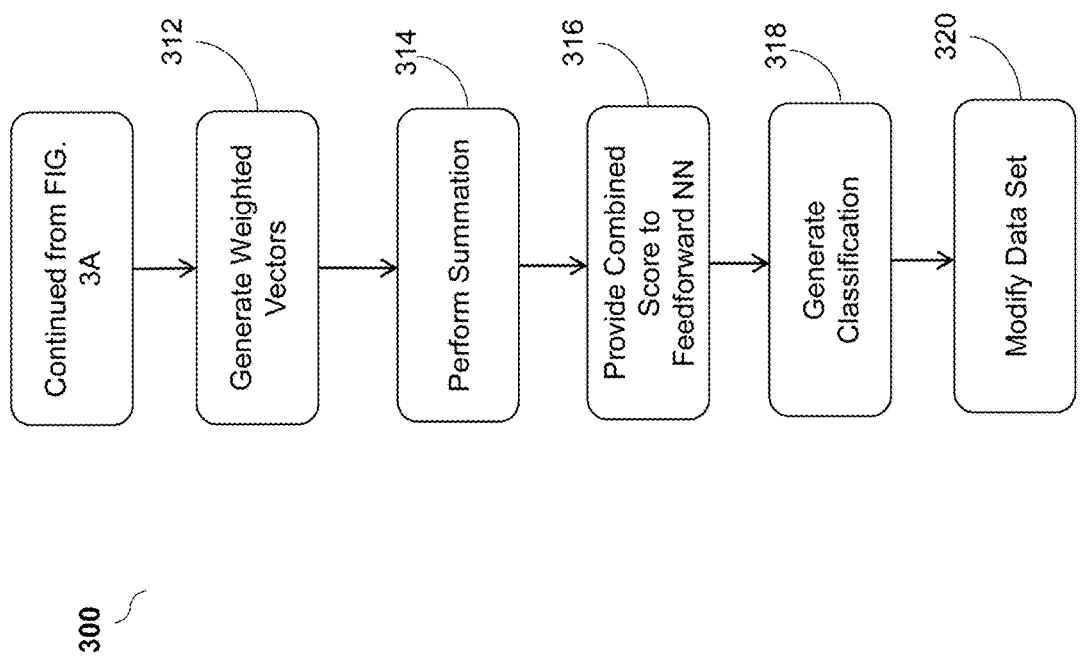

Now referring to FIGS. 3A-3B, a method 300 for localizing and classifying content in a data set is provided. In brief overview, the method 300 can include training an attention vector (302), providing a data set to a RNN (304), apply attention vector to activations (306), generating attention scores (308), localizing portions of data set (310), generating weighted vectors (312), perform summation (314), provide summed values to feedforward NN (316), generating a classification (318), and/or modifying the data set (320). Any of the foregoing operations may be performed by any one or more of the components or devices described herein, for example, the device 202.

Referring to 302, and in some embodiments, an attention vector can be trained. In some embodiments, the device 202 can generate an attention vector 224 from a training set of data having at least one of: one or more known classifications or one or more text data embeddings. The attention vector 224 can be trained or learned using a gradient included within the training set of data. The attention vector 224 can be generated by the device 202 previous data sets 230 from previous sessions. For example, the attention vector 224 can include a learned attention vector or a context vector.

The attention vector 224 can be trained using word embeddings, text embeddings or text classifications. For example, the text embedding can include or transform a text (e.g., alphanumerical character, symbol) into a numerical representation (e.g., an embedding) of the respective texts semantic meaning. Thus, the two words (or alphanumeric characters, symbols) that are semantically similar or related can be provided a similar or related embedding. The device 202 can generate the attention vector 224 to include or provide a vector representation for one or more words, alphanumeric characters or symbols. The device 202 can train the attention vector 224 with text embeddings such that for an individual portion 232 or sequence of portions 232 of one or more words related to the respective individual portion 232 or sequence of portions 232 can be determined. In some embodiments, the device 202 can use the attention vector 224 to provide context or relationship values to an individual portion 232 or sequence of portions 232 of the data set 230.

Referring to 304, and in some embodiments, a data set can be provided to a RNN. In some embodiments, the device 202 can provide a sequence of portions 232 of a data set 230 to a neural network 210 to generate a plurality of activations 213. Each activation 213 of the plurality of activations 213 can include at least one value from a layer of the neural network 210. For example, the neural network 210 can include two or more neural networks 210, such as but not limited to, a RNN 212 and a feedforward NN 214. The RNN 212 can correspond to a first stage of the neural network 210 and the feedforward NN 214 can correspond to a second stage of the neural network 210. The device 202 can provide the data set 230 including a plurality of portions 232 or sequence of portions 232 to the RNN 212. The data set 230 can include text data, image data, video data or audio data. For example, the data set 230 can include an image file (e.g., image stream), a video file (e.g., video stream), a text file (e.g., word stream), an audio file (e.g., audio stream) or any combination of an image file (e.g., image stream), a video file (e.g., video stream), a text file (e.g., word stream), and an audio file (e.g., audio stream).

The device 202 can provide two or more data sets 230 to the RNN 212. The two or more data sets 230 can be synchronized and then provided to the RNN 212. In some embodiments, a first data set 230a and a second data set 230b can be provided to the RNN 212, and the first data set 230a and the second data set 230b can be synchronized with each other based in part on time values or sequence values. For example, one or more time values can be determined for the first and second data sets 230a, 230b and/or for portions 232 of the first and second data sets 230a, 230b. The first data 230a and the second data set 230b can be portioned or segmented into portions 232 arranged or organized based in part on the time values. In some embodiments, the device 202 can synchronize a first portion 232 of the first data set 230a having a first time value with a first portion 232 of the second data set 230b having the first time value with each other. The device 202 can synchronize a second portion 232 of the first data set 230a having a second time value with a second portion 232 of the second data set 230b having the second time value with each other. The device 202 can synchronize an Nth portion 232 of the first data set 230a having an Nth time value with an Nth portion 232 of the second data set 230b having the Nth time value with each other. The device 202 can provide the synchronized data sets 230a, 230b and the synchronized portions 232 of the data sets 230a, 230b, to the RNN 212.

In some embodiments, the data set 230 can include a sequence of portions 232 of text data and a sequence of portions 232 of image data. Each of the portions 232 of text data can include or have a respective sequence value (e.g., timestamp), and each of the portions 232 of image data can include or have a corresponding sequence value. For example, the sequence value can include a time stamp, a sequence number corresponding to a position of the respective portion 232 in the sequence of portions 232, or a sequence identifier corresponding to a position of the respective portion 232 in the sequence of portions 232. The sequence value can be used to match or synchronize portions of different data sets together. For example, the sequence value can be used to match or synchronize portions of a first file with that of a second different file, such as but not limited to matching or synchronizing a text file, an image file, a video file or an audio file with one or more of a text file, an image file, a video file or an audio file. In some embodiments, the device can provide to the neural network 210 (e.g., RNN 212) a first portion 232 in the sequence of portions 232 of image data, and a first portion 232 in the sequence of portions 232 of text data having a sequence value corresponding to that of the first portion 232 in the sequence of portions of image data, to generate a first activation 213 of the plurality of activations 213.

In some embodiments, the neural network 210 can include a bi-directional recurrent neural network 212. The activations 213 can include values from a last hidden layer of the bi-directional RNN 212. For example, the bi-directional RNN 212 can include a plurality of layers including an input layer, one or more hidden layers, and an output layer. The RNN 212 can generate a plurality of activations 213 that correspond to the values generated at the second hidden layer of the RNN 212. In some embodiments, the activations 213 can correspond to a particular step or time value of the one or more data sets 230 provided to the RNN 212. For example, the portions 232 can be provided to input nodes of the input layer the RNN 212, as input vectors corresponding to a particular time value or time step. For each time step, the RNN 212 can generate an activation 213 at the second hidden layer or last hidden layer of the RNN 212. In some embodiments, for each time step, the RNN 212 can generate an activation 213 for each node of the second hidden layer or last hidden layer of the RNN 212 as a nonlinear function of the weighted sum of the activations 213 of all nodes connected to the respective node of the second hidden layer or last hidden layer of the RNN 212.

Referring to 306, and in some embodiments, the attention vector can be applied to activations. In some embodiments, the device 202 can apply an attention vector 224 to each activation 213 of the plurality of activations 213 to generate a sequence of values 215. The device 202 can perform a dot product between the attention vector 224 and the individual activations 213 of the RNN 212 to generate the sequence of values 215. For example, the device 202 can apply the attention vector 224 to each of the activations 213 to generate a probability distribution to predict or determine a future or subsequent portion 232 of a data set 230. The device 202 can apply the attention vector 224 to the plurality of activations 213 to generate the sequence of values 215. The sequence of values 215 can correspond to or include a probability distribution or weighted values (e.g., attention weights) to predict or determine a future or subsequent portion 232 of a data set 230. For example, the attention vector 224 can be applied to the plurality of activations 213 to generate the sequence of values 215. The sequence of values 215 can correspond to or include a probability distribution or weighted values used to predict or determine a future or subsequent portion 232 of a data set 230. In some embodiments, the sequence of values 215 can include weighted values, and the size or weight of a respective value 215 can correspond to an importance of the respective value 215 within the sequence of values 215.

Referring to 308, and in some embodiments, one or more attention scores can be generated. In some embodiments, the device 202, using a normalization function 220, can generate a sequence of attention scores 217 according to the sequence of values 215. The attention score 217 for an individual portion 232 can include or correspond to a group of component scores or multiples scores. In some embodiments, the plurality of attention scores 217 for the plurality of portions 232 of the data set 230 can include or correspond to a probability distribution over time for the respective data set 230. For example, the device 202 can execute the normalization function 220 to transform or modify the sequence of values 215 into a probability distribution (e.g., over time, over a time period) having a determined number of probabilities corresponding to or equal to the number of respective inputs or values in the sequence of values 215. In some embodiments, the device 202 using the normalization function 220, can normalize the sequence of values 215 to generate a probability distribution corresponding to a list of potential outcomes or predictions for one or more future portions 232 or subsequent portions 232 in the data set 230 based in part on one or more previous portions 232 of the data set 230. The probability distribution can include or correspond to the attention scores 217 generated for the data set 230. For example, the device 202 can normalize the sequence of values 215 using the normalization function 220 to turn the sequence of values 215 into attention scores 217 (e.g., probabilities) that sum to 1. In some embodiments, the normalization function 220 can include at least one of a softmax function, a softmax activation or a normalized exponential function.

The device 202 can apply the normalization function 220 to the sequence of values 215 to generate the attention scores 217 having weighted values. For example, the attention scores 217 can include or correspond to weighted attention scores 217, and the size or weight of a respective attention score 217 can correspond to an importance of the respective attention score 217 within the plurality of attention scores. In some embodiments, a higher or greater distribution value or weighted attention score 217 can indicate which portion 232 of the data set 230 the device 202 or neural network 210 is paying attention to or focusing on. For example, the attention scores 217 can include or correspond to a probability score or probability of a characteristic of the corresponding portion 232 of the data set 230. The device 202 can use attention score 217 to identify characteristics or determined properties based in part on a user, interest group, a certain category of news, information, a category of social media interaction or social media reaction. In some embodiments, peaks or high distribution values in the probability distribution can indicate where the device 202 or neural network 210 is paying attention to or focusing on. For example, a higher or greater distribution or weighted attention score 217 can indicate an important portion 232 of the data set 230 and a lower distribution or weighted attention score 217 can indicate a less important or unimportant portion 232 of the data set 230. In some embodiments, the importance of an attention score 217 can indicate a particular portion 232 that the device 202 or neural network 210 is currently focusing on or trying to localize or classify.

Referring to 310, and in some embodiments, portions of the data set can be localized. In some embodiments, the device 202 can identify a first portion 232 in the sequence of portions 232 of the data set 230 corresponding to a first attention score 217 of the sequence of attention scores 217. For example, the device 202 can identify the attention scores 217 corresponding to each or the portions 232 of the data set 230. In some embodiments, the device 202 can store the attention scores 217 corresponding to each or the portions 232 of the data set 230. The device 202 can identify a first portion 232 in the sequence of portions 232 of the data set 230 corresponding to a first attention score 217 of the sequence of attention scores 217, a second portion 232 in the sequence of portions 232 of the data set 230 corresponding to a second attention score 217 of the sequence of attention scores 217, and an Nth portion 232 in the sequence of portions 232 of the data set 230 corresponding to an Nth attention score 217 of the sequence of attention scores 217.

In some embodiments, the device 202 can compare the attention scores 217 for each portion 232 of the plurality of portions 232 of the data set 230 to the attention threshold to localize the plurality of portions 232 of the data set 230. The device 202 can use the attention scores 217 for the portions 232 of the data set 230 to localize or identify one or more portions 232 or one or more portions 232 having determined properties. For example, portions 232 having an attention score 217 greater than the attention threshold can be highlighted or flagged as having one or more determined properties. The determined properties can include properties that the device 202 is trying to identify within the data set 230. In some embodiments, the determined properties can include particular words, phrases, noises, symbols or actions within the data set 230 that the device 202 is attempting to identify and locate. The determined properties can include one or more preferences or a user or group of users. The determined properties can include characteristics of an interest group, a certain category of news, a category of information, or a category of social media content. The determined properties can include a type of content or feature (e.g., sports highlight play, interview with important figure in a news stream) within the data set 230. The determined properties can include an action or type of action within the data set 230 (e.g., homerun in a video stream of a baseball game). The determined properties can include a sparsity level of one or more portions 232 of the data set 230, for example, to reduce or remove redundant or meaningless portions 232 from the data set 230. In some embodiments, the attention scores 217 can indicate that a respective portion 232 includes one or more of the determined properties, and the device 202 can localize the portions 232 based in part on the attention score 217. The device 202 can flag or highlight the respective portions 232 having attention scores 217 greater than the attention threshold to localize the portions 232 of the data set 230. In some embodiments, the device 202 can localize the portions 232 based in part on the attention score 217 to later classify or subsequently edit or modify the data set 230.

In some embodiments, the device 202 can compare the attention scores 217 to the attention threshold to identify localized hotspots. For example, hotspots can include or correspond to determined properties, key features, important features or a noteworthy characteristic of content within the portions of the data set 230. In some embodiments, the device 202 can identify portions 232 that may be redundant, irrelevant or lacking content based in part on the comparison. For example, one or more portions 232 having attention scores 217 that are less than the attention threshold can indicate that the respective portions 232 include redundant, irrelevant content, or is lacking content, and can be ignored during classification, removed prior to classification, or removed during classification.

In some embodiments, the device 202 can maintain and store each of the attention scores 217 generated for the sequence of portions 232 of the data set 230, for example, in storage device 206 of the device 202. The device 202 can store and maintain the attention scores 217 based in part on a particular classification 222 applied to the corresponding portion 232 in the storage device 206. For example, an attention score 217 for a first portion 232 can be stored and maintained in the storage device 206 based in part on the classification 222 applied to the first portion 232. Thus, attention scores 217 for portions 232 given the same classification 222 can be stored or maintained in a common or same entry within the storage device 206. In some embodiments, the classification 222 data can be used to group attention scores 217 or identify trends for attention scores 217 and corresponding portions 232. In some embodiments, the device 202 can maintain and store attention scores 217 that are greater than or equal to the attention threshold. For example, the device 202 can store and maintain the attention scores 217 that are greater than or equal to the attention threshold for further processing based in part on a final classification 222 applied to the corresponding portion 232. In some embodiments, the device 202 can remove or delete attention scores 217 that are less than the attention threshold from the storage device 206, or not store attention scores 217 that are less than the attention threshold in the storage device 206.

In some embodiments, the device 202 can use the outputs of the localization methods as inputs to classification methods. For example, the device 202 can perform the localization of the portions 232 of the data set 230 to generate the attention scores 217. The attentions scores 217 can be used as inputs to perform classification on the portions 232 of the data set 230. For example, the device 202 can use the attention scores 217 to further process the portions 232 of the data set 230 to classify individual portions 232 of the data set 230 based in part on the content within the respective portions 232.

Referring to 312, and in some embodiments, weighted vectors (e.g., weighted RNN activations) can be generated. In some embodiments, the device 202 can apply the plurality of activations 213 to the sequence of attention scores 217 to generate a weighted vector 219 for each of the portions 232 of the data set 230. In some embodiments, a respective activation 213 for one of the portions 232 of the data set 230 can be applied to a respective attention score 217 for the one of the portions 232 of the data set 230. For example, the device 202 can apply the activation 213 for a portion 232 of the plurality of portions 232 of the data set 230 to the attention score 217 for the same portion 232 of the plurality of portions 232 of the data set 230. The device 202 can identify the activation 213 for each portion 232 of the plurality of portions 232 of the data set 230, and each attention score 217 for each portion 232 of the plurality of portions 232 of the data set 230. The activation 213 for each portion 232 of the plurality of portions 232 of the data set 230 can be applied to the corresponding or related attention score 217 for the respective portion 232 of the plurality of portions 232 of the data set 230. In some embodiments, a first activation 213 for a first portion 232 of the data set 230 can be applied to a first attention score 217 for the first portion 232 of the data set 230, a second activation 213 for a second portion 232 of the data set 230 can be applied to a second attention score 217 for the second portion 232 of the data set 230, and an Nth activation 213 for an Nth portion 232 of the data set 230 can be applied to an Nth attention score 217 for the Nth portion 232 of the data set 230.

The device 202 can generate a weighted vector 219 corresponding to each portion 232 of the data set 230. The weighted vector 219 for each of the portions 232 of the data set 230 can indicate a portion 232 of the data set 230 having one or more determined properties the device 202 or neural network 210 is attempting to identity within the data set 230. In some embodiments, a higher weighted vector 219 or a weighted vector 219 that is greater than a weighted threshold can indicate that the corresponding portion 232 includes one or more determined properties. In some embodiments, a lower weighted vector 219 or a weighted vector 219 that is less than a weighted threshold can indicate that the corresponding portion 232 does not include a determined property or the corresponding portion 232 includes redundant content or repeated content already identified within the data set 230.

Referring to 314, and in some embodiments, a summation can be performed. In some embodiments, the device 202 can combine the weighted vectors 219 for the portions 232 of the data set 230, into a combined score 221. For example, the device 202 can include or execute an adder function to sum or combine the weighted vectors 219 generated for each portion 232 of the plurality of portions 232 of the data set 230 to generate the combined score 221. In some embodiments, the combined score 221 can include or correspond to a weighted sum of the weighted vectors 219 generated for the portions 232 of the data set 230 or a total value of the weighted vectors 219 generated for the portions 232 of the data set 230.

Referring to 316, and in some embodiments, a combined score can be provided to a feedforward NN. In some embodiments, the device 202 can provide the combined score 221 as input to a feedforward NN 214 to determine a first classification 222 for the data set 230, from a plurality of classifications 222. The feedforward NN 214 can generate one or more classifications 222 to identity particular portions 232 of the data set 230 or identify portions 232 having one or more determined properties. The feedforward NN 214 can include an input layer, one or more hidden layers and an output layer. In some embodiments, the combined score 221 can be provided to an input layer or a plurality of input nodes of an input layer of the feedforward NN 214. The input nodes can pass the received combined score 221 to one or more nodes in a hidden layer of the feedforward NN 214. In some embodiments, an input node can pass the received combined score 221 to two or more nodes in a hidden layer of the feedforward NN 214. In some embodiments, the nodes in the hidden layer can combine the received values from one or more nodes of the input layer. In some embodiments, the feedforward NN 214 can include one hidden layer and the nodes in the hidden layer can provide the combined values to one or more nodes of an output layer of the feedforward NN 214. In some embodiments, the feedforward NN 214 can include two hidden layers and the nodes in the first hidden layer can provide the combined values to one or more nodes of a second hidden layer of the feedforward NN 214. The nodes in the second hidden layer can provide the combined values to one or more nodes of the output layer of the feedforward NN 214.

Referring to 318, and in some embodiments, one or more classifications can be generated. The feedforward NN 214 can generate one or more classifications 222 for the plurality of portions 232 of the data set 230 based in part on the properties of plurality of portions 232. In some embodiments, the output of the feedforward NN 214 can include or correspond to one or more classifications 222. The classifications 222 can include or correspond to properties of content included within the portions 232 of the data set 230. In some embodiments, the classifications 222 can include portions 232 to remove, portions 232 to highlight, portions 232 having particular features, portions 232 having particular words, phrases, language (e.g., type of language), content, audio, sounds, behaviors, actions or any combination of words, phrases, language (e.g., type of language), content, audio, sounds, behaviors or actions.

In some embodiments, the device 202 can include generate, store or maintain one or more classifications 222 in a storage device 206 of the device and the feedforward NN 214 can label one or more portions 232 of the data set 230 with a classification 222 based in part on the determined properties of the respective one or more portions 232. The device 202 or feedforward NN 214 can generate new classifications 222 for each data set 230 based in part on the determined properties of the one or more portions 232 of the respective data set 230. In some embodiments, the feedforward NN 214 can determine that two or more portions 232 include at least one common or same property and can classify the two or more portions 232 into a common or same classification 222. For example, in one embodiments, the feedforward NN 214 can classify a first group of portions 232 in a first classification 222 and the first classification 222 can correspond to a particular action (e.g., home run) in a baseball video. In some embodiments, the feedforward NN 214 can classify a second group of portions 232 in a second classification 222 and the second classification 222 can correspond to redundant content or content lacking particular words or actions, for example, to remove the respective portions 232 from the data set 230 as unimportant or unnecessary, or for other reason(s).

Referring to 320, and in some embodiments, the data set 230 can be modified. The device 202 can use the classifications 222 to suggest or recommend the respective portion 232 for a modified data set 230 corresponding to an output 240. For example, the classifications 222 can include or correspond to labeled or flagged portions 232 of the data set 230 that can be labeled or flagged to be included in a modified data set 230 or to be removed from the data set 230 and not included in the modified data set 230. In some embodiments, the classifications 222 can include or correspond to labeled or flagged portions 232 of the data set 230 that can be labeled or flagged to be re-arranged, or change a position of the respective portion 232 from an original position of the portion 232 in the original data set 230.

In some embodiments corresponding to a sports video highlight for instance, the device 202 can provide classifications 222 to portions 232 of the data set 230 including a video stream and word stream for an entire football game to suggest or recommend the respective one or more portions 232 that include highlight plays or important plays (e.g., touchdowns, field goals, sacks) to generate a modified data set 230 that corresponds to a highlight reel for the football game. The classifications 222 can include or indicate portions 232 to keep or include in the modified data set 230 and/or portions 232 to remove from the modified data set 230. The device 202 can remove portions 232 that include unimportant plays to reduce or condense the original data set 230 into a modified data set 230 having highlight plays or important plays.

In some embodiments, corresponding to an online gaming video with live commentary, the device 202 can provide classifications 222 to portions 232 of the data set 230 including a video stream of the online gaming video and a word stream for the live commentary to suggest or recommend the respective one or more portions 232 that include important topics or topics of interest to generate a modified data set 230 that corresponds to a condensed version of the gaming video. The classifications 222 can include or indicate portions 232 to keep or include in the modified data set 230 and/or portions 232 to remove from the modified data set 230. In some embodiments, the device 202 can highlight portions 232 that include topics of interest discussed in the commentary during the gaming video to reduce or condense the original data set 230 into a modified data set 230 having specific topics. The device 202 can remove portions 232 that include unimportant topics, topics discussed for a second or additional time, or parts of the commentary and/or gaming video with no action to reduce or condense the original data set 230 into a modified data set 230 having only important topics.

In some embodiments, the device 202 can generate the output 240 that includes a modified version of the data set 230 received by the device 202. In some embodiments, the device 202 can change an order of the portions 232 of the original data set 230 based in part on the classifications 222 to move or reposition portions 232 having a key feature, important feature or a noteworthy characteristic of content to a beginning segment of the data set 230. The device 202 can change an order of the portions 232 of the original data set 230 based in part on the classifications 222 to move or reposition portions 232 having no key features, no actions, or no noteworthy characteristic of content to a last or end segment of the data set 230. The device 202 can rearrange the original order of the portions 232 of the data set 230 received at the device 202 based in part on the classifications 222 provided to each of the respective portions 232 to highlight specific content first, key features first or noteworthy content first or prior to less important portions 232 of the data set 230. The device 202 can generate the output 240 corresponding to a modified data set 230 to include, to highlight, and/or to exclude a variety of different properties or features based in part on the attention vector 224, the RNN 212 and the feedforward NN 214. In some embodiments, the device 202 can generate the output 240 that includes recommendations or suggestions, or highlights particular portions 232 for a user or administrator to later make a determination if the respective classified portions 232 should be included within a modified data set 230.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, ele- ments and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
providing, by a device having one or more processors, a sequence of portions of a data set to a neural network to generate a plurality of activations, each activation of the plurality of activations comprising at least one value from a layer of the neural network;
applying, by the device, an attention vector to each activation of the plurality of activations to generate a sequence of values;
generating, by the device using a normalization function, a sequence of attention scores according to the sequence of values; and
identifying, by the device, a first portion in the sequence of portions of the data set corresponding to a first attention score of the sequence of attention scores.

2. The method of claim 1, further comprising:
applying, by the device, the plurality of activations to the sequence of attention scores to generate a weighted vector for each of the portions of the data set, wherein a respective activation for one of the portions of the data set is applied to a respective attention score for the one of the portions of the data set.

3. The method of claim 2, comprising:
combining, by the device, weighted vectors for the portions of the data set, into a combined score.

4. The method of claim 3, comprising:
providing, by the device, the combined score as input to a feedforward neural network to determine a first classification for the data set, from a plurality of classifications.

5. The method of claim 4, comprising:
identifying, by the device, at least one portion in the sequence of portions of the data set, according to the first classification.

6. The method of claim 5, comprising:
removing or modifying, by the device, the identified at least one portion in the data set.

7. The method of claim 1, comprising:
comparing, by the device, the attention scores to a threshold; and
identify, according to the comparing, at least one portion in the sequence of portions of the data set.

8. The method of claim 1, wherein the data set includes at least one of text data, image data, video data or audio data.

9. The method of claim 1, wherein the data set includes a sequence of portions of text data and a sequence of portions of image data, each of the portions of text data having a respective sequence value, and each of the portions of image data having a corresponding sequence value, and
providing, by the device to the neural network, a first portion in the sequence of portions of image data, and a first portion in the sequence of portions of text data having a sequence value corresponding to that of the first portion in the sequence of portions of image data, to generate a first activation of the plurality of activations.

10. The method of claim 1, wherein the neural network comprises a bi-directional recurrent neural network, and the plurality of activations comprise values from a last hidden layer of the bi-directional recurrent neural network.

11. The method of claim 1, comprising:
generating, by the device, the attention vector from a training set of data having at least one of: one or more known classifications, or one or more text data embeddings.

12. A device comprising:
one or more processors configured to:
provide a sequence of portions of a data set to a neural network to generate a plurality of activations, each activation of the plurality of activations comprising at least one value from a layer of the neural network;
apply an attention vector to each activation of the plurality of activations to generate a sequence of values;
generate, using a normalization function, a sequence of attention scores according to the sequence of values; and
identify a first portion in the sequence of portions of the data set corresponding to a first attention score of the sequence of attention scores.

13. The device of claim 12, wherein the one or more processors are further configured to apply the plurality of activations to the sequence of attention scores to generate a weighted vector for each of the portions of the data set.

14. The device of claim 13, wherein the one or more processors are further configured to combine weighted vectors for the portions of the data set, into a combined score.

15. The device of claim 14, wherein the one or more processors are further configured to provide the combined score as input to a feedforward neural network to determine a first classification for the data set, from a plurality of classifications.

16. The device of claim 15, wherein the one or more processors are further configured to identify at least one portion in the sequence of portions of the data set, according to the first classification.

17. The device of claim 16, wherein the one or more processors are further configured to remove or modify the identified at least one portion in the data set.

18. The device of claim 12, wherein the one or more processors are further configured to:
- compare the attention scores to a threshold; and
- identify, according to the comparing, at least one portion in the sequence of portions of the data set.

19. A non-transitory computer readable medium storing instructions when executed by one or more processors cause the one or more processors to:
- provide a sequence of portions of a data set to a neural network to generate a plurality of activations, each activation of the plurality of activations comprising at least one value from a layer of the neural network;
- apply an attention vector to each activation of the plurality of activations to generate a sequence of values;
- generate, using a normalization function, a sequence of attention scores according to the sequence of values; and
- identify a first portion in the sequence of portions of the data set corresponding to a first attention score of the sequence of attention scores.

20. The non-transitory computer readable medium of claim 19, further comprising instructions when executed by the one or more processors further cause the one or more processors to:
- apply the plurality of activations to the sequence of attention scores to generate a weighted vector for each of the portions of the data set.

* * * * *